US011494438B2

(12) United States Patent
Paulus et al.

(10) Patent No.: US 11,494,438 B2
(45) Date of Patent: *Nov. 8, 2022

(54) POPULATION OF FILE-CATALOG TABLE FOR FILE STAGE

(71) Applicant: Snowflake Inc., Bozeman, MT (US)

(72) Inventors: Polita Paulus, Kirkland, WA (US); Aravind Ramarathinam, Sammamish, WA (US); Saurin Shah, Kirkland, WA (US); Sukruth Komarla Sukumar, Bellevue, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,415

(22) Filed: Dec. 21, 2021

(65) Prior Publication Data

US 2022/0114217 A1 Apr. 14, 2022

Related U.S. Application Data

(63) Continuation of application No. 17/244,349, filed on Apr. 29, 2021, now Pat. No. 11,222,071, which is a
(Continued)

(51) Int. Cl.
*G06F 16/00* (2019.01)
*G06F 16/901* (2019.01)
(Continued)

(52) U.S. Cl.
CPC ...... *G06F 16/9017* (2019.01); *G06F 16/2282* (2019.01); *G06F 16/24568* (2019.01); *G06F 16/908* (2019.01); *G06F 16/955* (2019.01)

(58) Field of Classification Search
CPC ...... G06F 40/18; G06F 16/289; G06F 16/178; G06F 3/067; G06F 16/1834; G06F 16/93;
(Continued)

(56) References Cited

U.S. PATENT DOCUMENTS 8,863,082 B2  10/2014  Tsao et al.
9,020,992 B1   4/2015  Gunda et al.
(Continued)

FOREIGN PATENT DOCUMENTS

CN   110023923 A   7/2019
CN   111263937 A   6/2020
WO   2022005656    1/2022

OTHER PUBLICATIONS

"U.S. Appl. No. 16/942,352, Examiner Interview Summary dated Dec. 7, 2020", 3 pgs.
(Continued)

*Primary Examiner* — Yicun Wu
(74) *Attorney, Agent, or Firm* — Schwegman Lundberg & Woessner, P.A.

(57) ABSTRACT

Disclosed herein are systems and methods for population of a file-catalog table for a file stage in a user account on a data platform. In an embodiment, a data platform receives, from a client associated with a user account, a request to populate a file-catalog table of the user account based on a plurality of files stored in a file stage of the user account. The data platform responsively executes a list-files table function with respect to the file stage to generate a database-table object having a row for each file stored in the file stage. The data platform populates the file-catalog table of the user account based on the database-table object generated by the list-files table function.

25 Claims, 7 Drawing Sheets

Related U.S. Application Data continuation of application No. 16/942,352, filed on Jul. 29, 2020, now Pat. No. 10,997,243.

(60) Provisional application No. 63/046,229, filed on Jun. 30, 2020.

(51) Int. Cl.
  *G06F 16/955* (2019.01)
  *G06F 16/2455* (2019.01)
  *G06F 16/22* (2019.01)
  *G06F 16/908* (2019.01)

(58) Field of Classification Search
  CPC ...... G06F 40/12; G06F 40/131; G06F 40/134; G06F 40/137; G06F 40/166; G06F 40/174; G06F 9/449; G06F 9/465; G06F 9/543; G06F 3/0482; G06F 40/143; G06F 40/197; G06F 9/451; G06F 16/10; G06F 16/16; G06F 16/183; G06F 16/245; G06F 30/30; G06F 40/154; G06F 8/61; G06F 8/71; G06F 16/2882; G06F 16/532; G06F 16/94; G06F 16/9558; G06F 2203/04806; G06F 30/33; G06F 3/0481; G06F 3/0483; G06F 3/04842; G06F 16/13; G06F 16/188; G06F 16/24568; G06F 16/40; G06F 16/43; G06F 16/60; G06F 16/9017; G06F 16/90335; G06F 16/908; G06F 16/955; G06F 3/0484; G06F 3/165; G06F 8/31; G06F 8/38; G06F 11/1451; G06F 11/1458; G06F 11/1464; G06F 11/26; G06F 16/11; G06F 16/125; G06F 16/128; G06F 16/137; G06F 16/14; G06F 16/166; G06F 16/1734; G06F 16/1774; G06F 16/182; G06F 16/1824; G06F 16/1827; G06F 16/185; G06F 16/196; G06F 16/20; G06F 16/221; G06F 16/2246; G06F 16/23; G06F 16/2329; G06F 16/2365; G06F 16/2379; G06F 16/2471; G06F 16/252; G06F 16/258; G06F 16/273; G06F 16/278; G06F 16/4387; G06F 16/48; G06F 16/639; G06F 16/748; G06F 16/7834; G06F 16/951; G06F 16/9562; G06F 16/957; G06F 16/958; G06F 2009/45562; G06F 2009/45591; G06F 2111/10; G06F 21/54; G06F 21/604; G06F 21/6218; G06F 2221/2141; G06F 2221/2145; G06F 30/15; G06F 30/23; G06F 3/0614; G06F 3/065; G06F 3/1204; G06F 3/1206; G06F 3/1209; G06F 3/1228; G06F 3/1247; G06F 3/1253; G06F 3/1284; G06F 3/1285; G06F 3/1297; G06F 40/186; G06F 40/226; G06F 8/36; G06F 8/63; G06F 9/44552; G06F 9/4488; G06F 9/45558; G06F 9/547

See application file for complete search history.

(56) References Cited

U.S. PATENT DOCUMENTS

| | | | |
|---|---|---|---|
| 9,781,602 | B1 | 10/2017 | Girdhar et al. |
| 10,025,948 | B1 | 7/2018 | Chou Fritz et al. |
| 10,997,243 | B1 | 5/2021 | Paulus et al. |
| 11,222,071 | B1 | 1/2022 | Paulus et al. |
| 2006/0010419 | A1 | 1/2006 | Haselden |
| 2013/0061208 | A1 | 3/2013 | Tsao et al. |
| 2014/0330875 | A1 | 11/2014 | Gulamali |
| 2015/0193465 | A1 | 7/2015 | Schoeffler et al. |
| 2015/0199533 | A1 | 7/2015 | Chou Fritz et al. |
| 2016/0132572 | A1 | 5/2016 | Chang et al. |
| 2017/0031929 | A1 | 2/2017 | Mackay et al. |
| 2017/0264687 | A1 | 9/2017 | Beerana et al. |
| 2017/0366977 | A1 | 12/2017 | Girdhar et al. |
| 2018/0032538 | A1* | 2/2018 | Balestrazzi ............. H04L 67/06 |
| 2018/0150528 | A1 | 5/2018 | Shah et al. |
| 2018/0302412 | A1 | 10/2018 | Achtermann et al. |
| 2019/0008981 | A1 | 3/2019 | Wu et al. |
| 2019/0020541 | A1 | 7/2019 | Goldberg et al. |
| 2021/0034606 | A1 | 2/2021 | Stamos et al. |
| 2021/0081389 | A1 | 3/2021 | Liu et al. |
| 2021/0406310 | A1 | 12/2021 | Paulus et al. |
| 2021/0406311 | A1 | 12/2021 | Brossard et al. |

OTHER PUBLICATIONS

"U.S. Appl. No. 16/942,352, Non Final Office Action dated Sep. 3, 2020", 12 pgs.

"U.S. Appl. No. 16/942,352, Notice of Allowance dated Jan. 21, 2021", 9 pgs.

"U.S. Appl. No. 16/942,352, Response filed Dec. 2, 2020 to Non Final Office Action dated Sep. 3, 2020", 13 pgs.

"U.S. Appl. No. 17/244,349, Examiner Interview Summary dated Oct. 15, 2021", 2 pgs.

"U.S. Appl. No. 17/244,349, Non Final Office Action dated Jul. 9, 2021", 14 pgs.

"U.S. Appl. No. 17/244,349, Notice of Allowance dated Nov. 15, 2021", 9 pgs.

"U.S. Appl. No. 17/244,349, Response filed Oct. 7, 2021 to Non Final Office Action dated Jul. 9, 2021", 12 pgs.

"U.S. Appl. No. 17/244,349, Supplemental Notice of Allowability dated Nov. 24, 2021", 6 pgs.

"U.S. Appl. No. 17/390,969, Notice of Allowance dated Sep. 29, 2021", 10 pgs.

"U.S. Appl. No. 17/390,969, Preliminary Amendment Filed Aug. 5, 2021", 7 pgs.

"U.S. Appl. No. 17/463,325, Non Final Office Action dated Nov. 26, 2021", 13 pgs.

"International Application Serial No. PCT/US2021/034530, International Search Report dated Jun. 29, 2021", 2 pgs.

"International Application Serial No. PCT/US2021/034530, Written Opinion dated Jun. 29, 2021", 4 pgs.

"U.S. Appl. No. 17/390,969, Notice of Allowance dated Apr. 14, 2022", 8 pgs.

"U.S. Appl. No. 17/463,325, Notice of Allowance dated Mar. 22, 2022", 9 pgs.

"U.S. Appl. No. 17/657,548, Non Final Office Action dated Jun. 9, 2022", 10 pgs.

"Chinese Application Serial No. 202180001774., Voluntary Amendment filed Apr. 27, 2022", (w/ English Translation of Claims), 34 pgs.

"U.S. Appl. No. 17/463,325, Response filed Feb. 24, 2022 to Non Final Office Action dated Nov. 26, 2021", 12 pgs.

U.S. Appl. No. 16/942,352 U.S. Pat. No. 10,997,243, filed Jul. 29, 2020, Supporting Unstructured, Semi-Structured, and Structured Files.

U.S. Appl. No. 17/244,349 U.S. Pat. No. 11,222,071, filed Apr. 29, 2021, File-Catalog Table for File Stage.

U.S. Appl. No. 17/463,325 U.S. Pat. No. 11,361,026, filed Aug. 31, 2021, Accessing Files in a Database Stage Using a User Defined Function.

U.S. Appl. No. 17/390,969, filed Aug. 1, 2021, Accessing Files in a Database Stage Using a User Defined Function.

U.S. Appl. No. 17/657,548, filed Mar. 31, 2022, Accessing Files in a Database Stage Using a User Defined Function.

"Chinese Application Serial No. 202180001774.4, Office Action dated Jun. 17, 2022", (w/ English Translation), 10 pgs.

(56) References Cited

OTHER PUBLICATIONS

"U.S. Appl. No. 17/657,548, Response filed Sep. 7, 2022 to Non-Final Office Action dated Jun. 9, 2022", 10 pgs.

* cited by examiner

POPULATION OF FILE-CATALOG TABLE FOR FILE STAGE

CROSS-REFERENCE TO RELATED APPLICATIONS

This application is a Continuation of U.S. patent application Ser. No. 17/244,349, filed Apr. 29, 2021; which is a Continuation of U.S. patent application Ser. No. 16/942,352 filed Jul. 29, 2020 and issued on May 4, 2021 as U.S. Pat. No. 10,997,243; which claims the benefit of U.S. Provisional Patent Application Ser. No. 63/046,229 filed Jun. 30, 2020, the contents of which are incorporated herein by reference in their entireties.

TECHNICAL FIELD

The present disclosure relates to data platforms and, more particularly, to systems and methods for supporting unstructured, semi-structured, and structured files.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, a data platform may include one or more databases that are respectively maintained in association with any number of customer accounts, as well as one or more databases associated with one or more system (e.g., administrative) accounts of the data platform, one or more other databases used for administrative purposes, and/or one or more other databases that are maintained in association with one or more other organizations and/or for any other purposes. A data platform may store metadata in association with the data platform in general and in association with particular databases and/or particular customer accounts as well. Metadata that is maintained by a data platform with respect to stored data (e.g., stored customer data) may be referred to herein at times as "expression properties."

Users and/or executing processes—that may be associated with, e.g., a given customer account—may, via one or more types of clients, be able to cause data to be ingested into one or more databases in the data platform, and may also be able to manipulate the data, run queries against the data, create customized views (which are also known as secure views) of the data, modify the data, insert additional data, remove data, and/or the like. Some example types of clients include web interfaces, Java Database Connectivity (JDBC) drivers, Open Database Connectivity (ODBC) drivers, one or more other types of drivers, desktop applications, mobile apps, and the like.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like. A given table may be organized as records (e.g., rows) that each include one or more attributes (e.g., columns). A data platform may physically store database data in multiple storage units, which may be referred to as blocks, micro-partitions, and/or by one or more other names.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Introduction

Figure 1:
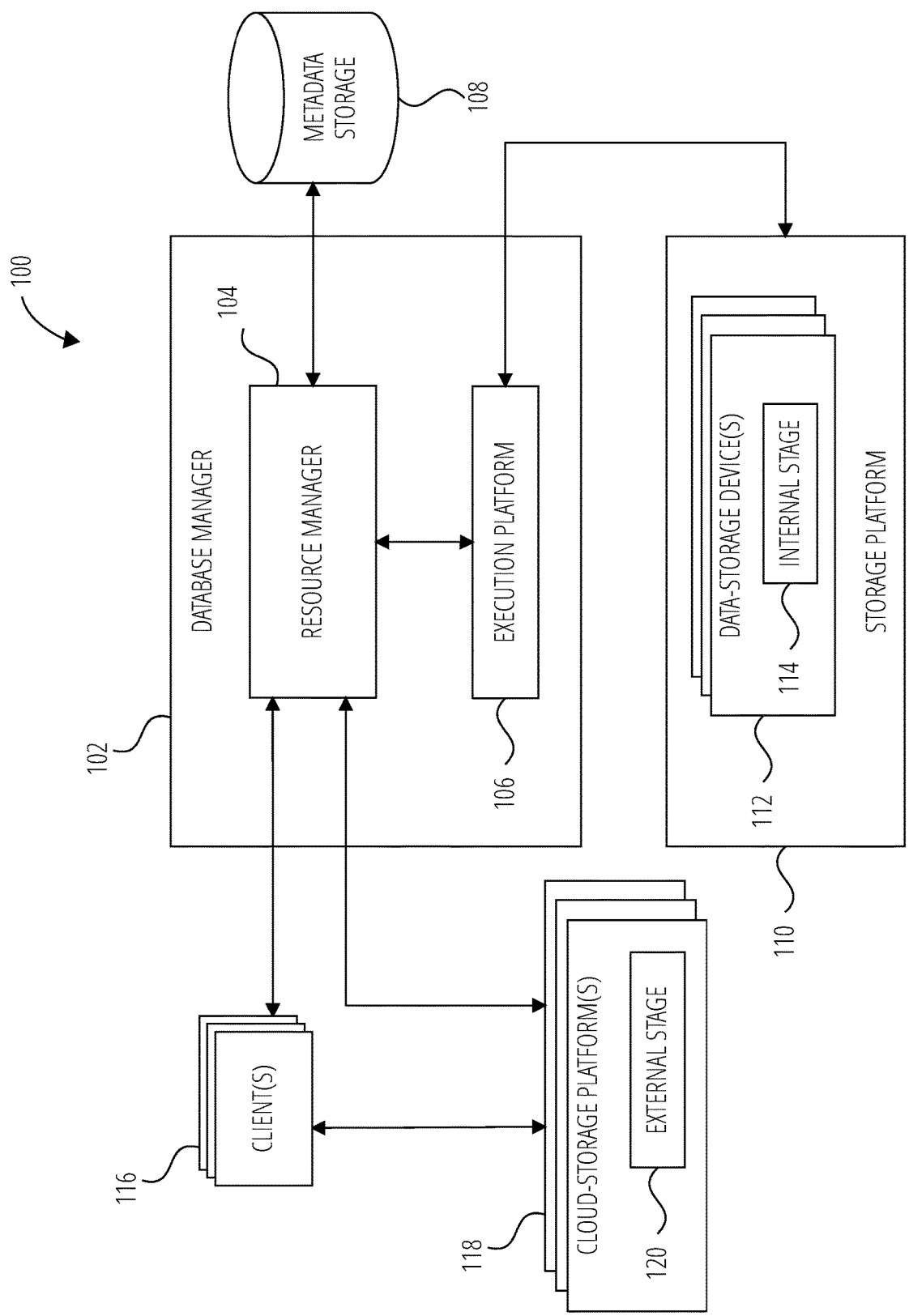
FIG. 1 illustrates an example data platform, in accordance with at least one embodiment.

In the present disclosure, physical units of data that are stored in a data platform—and that make up the content of, e.g., database tables in customer accounts—are referred to as micro-partitions. In various different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in a number of varieties, including unstructured files, semi-structured files, and structured files. These terms may mean different things to different people. As used herein, examples of unstructured files include image files, video files, PDFs, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories, and may use one or more different categories instead of or in addition to one or more of these.

As alluded to above, it is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their own servers and/or on one or more cloud-storage platforms such as AMAZON WEB SERVICES™ (AWS™), MICROSOFT® AZURE®, GOOGLE CLOUD PLATFORM™, and/or the like. The customer's own servers and cloud-storage platforms are both examples of what a given customer could use as what is referred to herein as an external storage location. And as described below, a data platform could also use a cloud-storage platform as what is referred to herein as an internal storage location with respect to the data platform.

From the perspective of an example data platform, one or more files that are stored at one or more storage locations are referred to herein as being organized into one or more of what are referred to herein as either "internal stages" or "external stages," where internal stages are stages that correspond to data storage at one or more internal storage locations, and where external stages are stages that correspond to data storage at one or more external storage locations. Thus, in the parlance of this disclosure, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

Accordingly, a customer account on a data platform may include one or more account-level objects that correspond respectively to one or more stages, one or more of which could be internal stages, and one or more of which could be external stages. One or more other types of stages could be implemented instead of and/or in addition to the internal stages and external stages that are described by way of example in the present disclosure.

In an example customer account that includes at least one internal stage and at least one external stage, each internal stage may have a stage name as a user-settable property of the internal stage, and the data platform may manage the actual storage location of that internal stage "behind the scenes," such that the customer generally is not and generally need not be explicitly aware of the actual precise storage location (e.g., the Uniform Resource Locator (URL)) of that internal stage. Each external stage may have not only a stage name (for the customer's convenience and for other reference), but each external stage may also have a user-settable property that explicitly points (in the form of, e.g., a URL) to the external storage location of the corresponding external stage. The stage-location property of a given stage is referred to herein at times as the "stage URL" of that stage; in the case of both internal and external stages, the stage-name property of a given stage is referred to herein as the "stage name" of that stage; both of these stage-property labels are presented here as examples and not by way of limitation.

In some current implementations of data platforms, a customer of a data platform may use an application (e.g., a custom application) to extract various metadata items from various external files that the customer keeps at an external storage location. The customer may store that extracted metadata in one or more tables in the customer's account on the data platform. In one such example, the customer may create a table in which each external file is represented by a row in the table and each metadata item that is extracted and stored in the table occupies a column in the table. In many instances, a customer may also include, in the table, a column in which the customer stores a URL corresponding to the location of the external file in the external storage location, so that the URL is associated in the table with the other metadata items that also correspond to the respective external file. In such a table, the URL is typically stored as a string (e.g., as an instance of an alphanumeric-character-string data type), and is generally not operative to simply be clicked on for downloading or opening the external file from the corresponding external storage location, since security credentials are typically required for such access.

In some instances, instead of or in addition to metadata, customers may use an application (e.g., a custom application) to extract one or more pieces of content (e.g., one or more fields, one or more particular bytes, etc.) from an external file and then store the one or more pieces of extracted content in a given column of the same or another table in their account on the data platform. In many instances, the data platform does not natively support the particular type of structured file that is used and externally stored by the customer. Among other consequences of that lack of native support, it is often the case that, using their respective data-platform clients (e.g., JDBC drivers), the associated customer is only able to share and/or replicate the table—of metadata and/or extracted content—and is not able to use their respective data-platform clients to share or replicate the actual external files themselves.

To address these and other shortcomings of prior implementations, disclosed herein are various embodiments of systems and methods for supporting unstructured files, semi-structured files, structured files, and any other types of files at a data platform. The various embodiments that are described herein are described with reference where appropriate to one or more of the various figures.

One embodiment takes the form of a method that includes receiving, at a data platform that includes at least one hardware processor, a stage-creation instruction from a client, the stage-creation instruction requesting creation by the data platform of creation of a file stage for a user account on the data platform, the user account being associated with the client. The method also includes receiving, at the data platform, a file-catalog-table-creation instruction from the client, the file-catalog-table-creation instruction requesting creation by the data platform of a file-catalog table for the file stage. The method also includes creating, by the data platform in response to receiving the file-catalog-table-creation instruction, the file-catalog table for the file stage, the file-catalog table containing one or more metadata items corresponding to one or more files in the file stage.

One or more embodiments of the present disclosure take the form of methods that include multiple operations. One or more other embodiments take the form of systems (e.g., data platforms) that include at least one hardware processor and that also include one or more computer-storage media containing instructions executable by the at least one hardware processor for causing the at least one hardware processor to perform multiple operations (that may or may not correspond to operations performed in a herein-disclosed method embodiment). Still one or more other embodiments take the form of one or more computer-storage media containing instructions executable by at least one hardware processor (of, e.g., a data platform) for causing the at least one hardware processor to perform multiple operations (that, again, may or may not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment (e.g., a data-platform embodiment), a computer-storage-medium (or computer-storage-media) embodiment, and/or one or more other types of embodiments. Furthermore, this flexibility and cross-applicability of embodiments is present in spite of the use herein of any slightly different language (e.g., processes, methods, methodologies, steps, operations, functions, and/or the like) to describe and/or characterize such embodiments and/or any element or elements thereof.

Data-Platform Architecture and Environment

FIG. 1 illustrates an example data platform 100, in accordance with at least one embodiment. In various embodiments, the data platform 100 may be used for performing one or more of the operations (e.g., one or more of the methods) that are disclosed herein. As shown in FIG. 1, the data platform 100 includes a database manager 102, which includes a resource manager 104 and an execution platform 106. The database manager 102 need not be a defined physical device, though it could be, but in general is used herein as shorthand to refer to the combination of the resource manager 104 and the execution platform 106. The execution platform 106 may include one or more execution nodes (e.g., servers, workers, threads, and/or the like). A grouping of execution nodes in the execution platform 106 may be referred to as a virtual warehouse, and such virtual warehouses are, in some embodiments, dynamically scalable to meet dynamically changing demands. Also depicted in FIG. 1 are a metadata storage 108, a storage platform 110 that includes one or more data-storage devices 112—an example one of which includes an example internal stage 114, one or more clients 116, and one or more cloud-storage platforms 118—an example one of which includes an example external stage 120. In various different implementations, there could be any number of any of the entities that are shown in FIG. 1, including any number of internal stages 114 and any number of external stages 120. Moreover, different internal stages 114 could reside in different data-storage devices 112, and different external stages 120 could reside in different cloud-storage platforms 118.

In some embodiments, all of the entities—other than the one or more cloud-storage platforms 118—that are depicted in FIG. 1 are part of what is referred to herein as the data platform 100, though this is not the case in other embodiments. For example, in at least one embodiment, the data platform 100 does not include any of the one or more clients 116. As another example, in some embodiments, the data platform 100 does not include the storage platform 110. In the embodiments that are primarily described herein to illustrate various examples, the data platform 100 includes the database manager 102 (including the resource manager 104 and the execution platform 106), the metadata storage 108, and the storage platform 110, and does not include any of the one or more clients 116 or any of the one or more cloud-storage platforms 118 (and therefore does not (physically) include any external stages 120). As described below and as mentioned above, the storage platform 110 could be implemented in whole or in part on a cloud-storage platform and still be considered part of the data platform 100.

The resource manager 104 may be configured to manage a number of different types of tasks including external database tasks (e.g., query requests) that are received from, e.g., a client 116. The resource manager 104 may be coupled to any number of clients 116. A client 116 may facilitate end users making data-storage and/or data-retrieval requests, system administrators managing the data platform 100, and/or the like. In various different embodiments, a client 116 could be a web interface, a JDBC driver, an ODBC driver, a desktop application, a mobile app, and/or another type of client. As shown in FIG. 1, a client 116 may communicate with the data platform 100 (e.g., the resource manager 104 of the database manager 102) and one or more cloud-storage platforms 118. A client 116 could reside on a client-side computing device on which the client 116 interacts with one or more client-side applications and on which the client 116 makes use of certain client-side-system resources such as network interfaces, user interfaces, memory (e.g., random access memory (RAM)), and/or the like.

As depicted in FIG. 1, the resource manager 104 is communicatively coupled to the metadata storage 108, which in at least one embodiment is associated with data stored throughout the data platform 100, and may also reflect data stored on one or more external stages 120. Indeed, in some embodiments, the metadata storage 108 includes one or more summaries of data available in one or more local caches (of, e.g., the resource manager 104 and/or the execution platform 106), data stored in the storage platform 110, and/or data stored in one or more external stages 120. Additionally, the metadata storage 108 may include information regarding how data is organized in one or more local caches, one or more storage platforms 110, one or more external stages 120, and/or the like.

Among other uses, the metadata storage 108 may allow systems and services of the data platform 100 to determine whether a given quantum of data needs to be processed (in connection with, e.g., a given query) without loading or accessing the actual stored data. In various embodiments, metadata may reflect the contents of one or more databases, one or more tables, one or more columns, one or more views, and/or one or more other collections of records, parts of records, and/or other data quanta. With respect to where the metadata storage 108 is actually stored, a separate (e.g., local) storage location (e.g., a key-value store) is used in some embodiments, while in other embodiments the metadata storage 108 is maintained by the data platform 100 as a subset of the data stored in the storage platform 110. Other architectures are possible as well.

The resource manager 104 is also communicatively coupled to the execution platform 106, which may provide multiple computing resources that execute various tasks involving data storage, data retrieval, data analysis (e.g., query processing), and/or the like. In at least one embodiment, the resource manager 104 includes a layer of code (e.g., Java code) that is global with respect to the data platform 100, where that code layer includes instructions for performing functions such as compiling queries and brokering requests to one or more execution nodes in the execution platform 106. In some embodiments, there exists one or more instances of the execution platform 106 used for executing (i) client tasks, such as database queries and/or (ii) internal database tasks such as updating metadata, clustering tables, generating views, and/or the like. In some such embodiments, there also exists one or more instances of the execution platform 106 used for feature development and/or testing of the data platform 100, and each such instance of the execution platform 106 may be separate from each client-task instance of the execution platform 106, such that, for example, client-task processing is not impacted by feature-development tasks, data-platform-administration tasks, and/or the like. Other arrangements are possible as well.

The execution platform 106 may be coupled to the one or more data-storage devices 112 that are part of the storage platform 110, which may include (and an execution platform 106 may be capable of communicating with) any number of data-storage devices 112. In some embodiments, one or more of the data-storage devices 112 are cloud-based storage devices located in one or more geographic locations. For example, one or more of the data-storage devices 112 may be part of a public cloud infrastructure or a private cloud infrastructure. One or more of the data-storage devices 112 may be or include hard disk drives (HDDs), solid state drives (SSDs), storage clusters, and/or any other data-storage technology. In some examples, the storage platform 110 includes distributed file systems (such as Hadoop Distributed File Systems (HDFSs)), object storage systems, and/or the like. As mentioned above and as described more fully below, the one or more data-storage devices 112 of the storage platform 110 may contain one or more internal stages 114.

As shown in FIG. 1, the storage platform 110, including the one or more data-storage devices 112, is decoupled from the computing resources associated with the execution platform 106, the resource manager 104, and the database manager 102 generally. In an embodiment, each of a plurality of data-platform deployments includes a respective storage platform 110 having its own respective one or more data-storage devices. That type of architecture supports dynamic changes to the data platform 100 based on changing data-storage and/or data-retrieval needs, as well as changing needs of users and systems accessing the data platform 100. The support of dynamic changes allows the data platform 100 to scale quickly in response to changing demands on the systems and components within the data platform 100. The decoupling of the computing resources from the data-storage devices supports the storage of large amounts of data without requiring a corresponding large amount of computing resources. Similarly, this decoupling supports a significant increase in the computing resources utilized at a particular time without requiring a corresponding increase in data-storage resources.

As a general matter, in at least some embodiments, the data platform 100 can be referred to using terms such as a cloud data platform, a cloud-based data warehouse, a network-based data warehouse, or simply a data warehouse. A cloud data platform is one type of network-based data system that can be used for data analysis and reporting and that includes a central repository of integrated data from one or more disparate sources. A cloud data platform is commonly an OLAP database that can store current and historical data that can be used for creating analytical reports for an enterprise based on data stored within databases maintained on behalf of the enterprise. To this end, cloud data platforms often provide business-intelligence tools, tools to perform extract-transform-load (ETL) tasks for ingesting data into the repository, tools to manage and retrieve metadata, and/or the like. There are other types of cloud data platforms, such as OLTP databases, as well as data platforms, data warehouses, and other data systems that operate with characteristics of multiple types of database systems. As used herein, "data platform" refers to any one or any combination of any of the terms used in this paragraph, in this disclosure generally, and similar terms used in the art.

Moreover, any one or more of the components, devices, systems, and/or the like that are depicted in FIG. 1 and in any of the other figures could be implemented as one or more computing devices having an architecture that is similar to the example computing device 700 that is described below in connection with FIG. 7. Moreover, two or more of the entities that are depicted in any of the figures could be combined into a single component, and any entity that is depicted as a single component in any of the figures could instead be distributed across multiple components (e.g., distributed across multiple systems, platforms, and/or the like at multiple geographic and/or network-topology locations). Moreover, in particular embodiments, any one or more of the communication links that are depicted in FIG. 1 and in any of the other figures could be implemented via one or more data-communication networks, which may utilize any communication protocol and any type of communication medium. In some embodiments, the data-communication networks are a combination of two or more data-communication networks (or sub-networks) coupled to one another. In various different embodiments, these communication links are implemented using one or more of any types of communication medium and one or more of any types of communication protocol.

Stage Creation and Encryption

In some embodiments, a given data-platform customer is, as described above, able to use a client 116 to create one or more internal stages 114 and/or one or more external stages 120. The customer may provide the data platform 100 with login credentials (e.g., username and password) for each external stage 120 that is represented by a corresponding external-stage object in the customer's account on the data platform 100, so that the data platform 100 can conveniently interact with the corresponding external stage 120 and/or the one or more external files stored therein.

With respect to internal stages 114, in at least one embodiment, the data platform 100 provides an option to a user that is creating an internal stage 114 to set an encryption property of the internal stage 114 to be either what is referred to herein as "full encryption" or what is referred to herein as "server-side-only encryption." In at least one embodiment, internal stages 114 that have their encryption property set to full encryption are both server-side-encrypted and client-side-encrypted, whereas internal stages 114 that have their encryption property set to server-side-only encryption are server-side-encrypted but are not client-side-encrypted. Furthermore, in at least one embodiment, external stages 120 that are created without either full encryption or server-side-only encryption being specified are by default set to use full encryption. And though the option is not discussed at length herein, an implementation using client-side-only encryption could be used as well.

As used herein, in at least one embodiment, an internal stage 114 being "server-side-encrypted" means that the data (including, e.g., one or more internal files) in the internal stage 114 is encrypted "at rest" in the storage platform 110 by the data platform 100 or by a storage provider (e.g., a cloud-storage platform) that is used by the data platform 100 for implementing its storage platform 110. In a typical implementation in which the data platform 100 uses a storage provider for the storage platform 110, the storage provider may use their own encryption/decryption keys to decrypt internal files prior to transmitting the internal files to the data platform 100 (in the case of, e.g., a customer requesting a download of one or more of their internal files from the data platform 100 to, e.g., the customer's own server or other computer), where such transmission from the storage provider to the data platform 100 could be safeguarded through the use of HyperText Transfer Protocol Secure (HTTPS) communication that itself makes use of the Transport Layer Security (TLS) protocol, which is an updated version of the Secure Sockets Layer (SSL) protocol.

Furthermore, as used herein, in at least one embodiment, an internal stage 114 being "client-side-encrypted" means that, when a customer requests a download of one or more of their internal files from the internal stage 114, and after the data platform 100 requests and receives copies of the one or more internal files from the storage provider, the data platform 100 encrypts the one or more internal files with one or more encryption/decryption keys that are managed by the data platform 100, and then transmits the client-side-encrypted internal files to the customer (e.g., to the particular client 116 used by the customer to request the download). That transmission could also be an HTTPS/TLS transmission. In at least one other embodiment, the one or more internal files are transmitted (using, e.g., HTTPS/TLS transmission) from the data platform 100 to the client 116 without the one or more internal files being first encrypted by the data platform 100 using one or more encryption/decryption keys that are managed by the data platform 100, and then the one or more internal files are encrypted by the client 116 on the client side using one or more encryption/decryption keys that are managed by the data platform 100. Either way, the one or more encryption/decryption keys that are managed by the data platform 100 are needed beyond the client 116 on the client side to access the content of the one or more internal files. Other implementations are possible as well.

Thus, in the case of an internal stage 114 being client-side-encrypted, after receiving their one or more downloaded files from their internal stage 114, the associated customer needs a copy of the one or more encryption/decryption keys that are managed by the data platform 100 to be able to successfully open and substantively use the one or more downloaded internal files. If, however, an internal stage 114 is not client-side-encrypted, the data platform 100 may provide for the download (via, e.g., an HTTPS/TLS transmission) by the customer's client 116 of (otherwise) unencrypted internal files—i.e., the data platform 100 would not explicitly use any encryption/decryption keys to encrypt the one or more internal files prior to transmitting them to the customer's client 116, nor would the client 116 use any such encryption/decryption keys to encrypt the one or more internal files after receipt of the one or more internal files from the data platform 100, and the customer would not need any encryption/decryption keys that are managed by the data platform 100 in order to successfully open and substantively use the one or more internal files.

Defined Functions

In at least one embodiment of the present disclosure, the data platform 100 provides one or more functions for use by, e.g., customers, internal developers, external developers, and/or the like of the data platform 100. Some such functions are described by way of example below. In this disclosure, functions are referenced using a "function_name( )" notation, where "function_name" is the name of a given function, and where the empty parentheses (i.e., the "( )") at the end of the function name identify it as being a function (as opposed to, e.g., a stage, a stage-property name, a data value, etc.). It is further noted that the "( )" at the end of a given function name in no way implies that the function takes zero arguments: it could, but it could just as well take one or more arguments as described by way of example herein. As some options, in at least one embodiment, any one or more of these functions can be called within Java functions, within JavaScript stored procedures, as predicates within Structured Query Language (SQL) statements, and/or the like.

Function: get_relative_path( )

One function that is provided by the data platform 100 in at least one embodiment is referred to herein as get_relative_path( ). In at least one embodiment, the function get_relative_path( ) enables users (e.g., customers, internal developers, external developers, other coders, and/or the like) to obtain what is referred to herein as the "relative path" of a given file that is stored on a given internal stage 114 or external stage 120. As used herein, the relative path of a file that is stored on a stage is a terminal portion of the network location (i.e., the "absolute path," e.g., the URL) of the file on the stage. The absolute path of a given file, the stage URL of the stage on which the file resides, and the relative path of the given file in that stage fit together in at least one embodiment as follows:

absolute_path=[stage_URL][relative_path]

(where the square brackets are shown to illustratively delineate the stage URL from the relative path and are not shown to indicate that they are actually textually present). Thus, in at least one embodiment, the absolute path (represented at times herein as "absolute_path") of a given file is a concatenation of the stage URL for that file and the relative path for that file, in that order from left to right. Furthermore, by convention, in this disclosure, each stage URL (represented at times herein as "stage_URL") does not end in a forward slash ("/"), and each relative path (represented at times herein as "relative_path") starts with one. The opposite convention would work just as well.

In at least one embodiment, the function get_relative_path( ) takes two arguments: (1) the name of an internal stage 114 or an external stage 120 (the stage name being represented at times herein as "stage_name") and (2) the absolute path of a file that is stored on that internal stage 114 or external stage 120. A call of the function get_relative_path( ) may take the form of:

```
select get_relative_path
(
    stage_name,
    'absolute_path'
);
```

In at least one embodiment, the function get_relative_path( ) returns the relative path of the file on the stage as a string.

In an example scenario, a customer may create an internal stage 114 using the following example commands:
create stage<my_images_stage>
encryption=(type=SSE)
where "SSE" stands for server-side-encrypted, which is a term that is discussed above. Or the customer may create an external stage 120 using the following example commands:

```
create stage <my_images_stage>
    stage_URL = 's3://example_bucket/my_images_stage'
``` where the form of the stage_URL that is depicted uses AWS™ as an example cloud-storage platform 118, and where "s3: //example_bucket" is a placeholder for text such as:
https://example_bucket.s3.amazonaws.com Those of skill in the art will appreciate that different cloud-storage platforms have different syntaxes. Whether an internal stage 114 or an external stage 120, the customer now has created a stage that is called "my_images_stage." It is noted that, if my_images_stage is an internal stage 114, it still has a stage URL, but one that may be determined by the data platform 100 and not explicitly set or provided by the user that creates the internal stage 114.

Returning to the function get_relative_path( ), in an example scenario, a customer may create two top-level (i.e., top level with respect to the stage) folders in my_images_stage called "landscapes" and "skylines," and the customer may store, as an example, fifty image files respectively named "image01.jpg" through "image50.jpg" in the "landscapes" folder and thirty images files respectively named "image51.jpg" through "image80.jpg" in the "skylines" folder. Thus, assuming for this example scenario that my_images_stage is an external stage 120 created with the example commands that are shown above, an example absolute path of an example file "image27.jpg" on that external stage 120 is:
s3:     //example_bucket/my_images_stage/landscapes/
    image27.jpg As the term is used in the present disclosure, the relative path for that external file is:
/landscapes/image27.jpg Moreover, the stage name is my_images_stage, and the stage URL is:
s3: //example_bucket/my_images_stage
Thus, a function call such as:

```
select get_relative_path
(
    my_images_stage,
    's3://example_bucket/my_images_stage/landscapes/image27.jpg'
);
``` would, in this example scenario, return the string
/landscapes/image27.jpg
as the relative path of that file with respect to that stage.

The function get_relative_path( ) may operate at least in part by referencing the my_images_stage object, identifying
s3: //example_bucket/my_images_stage
as the stage URL of that stage, and returning the terminal portion (i.e., the substring) of the provided absolute path that comes after the identified stage URL of the external stage 120. In at least one embodiment, the data platform 100 imposes a restriction on the function get_relative_path( ), which is that the provided absolute path be a subpath of the stage URL of the stage that has the provided stage name. As an example, the absolute path
s3:     //example_bucket/my_images_stage/landscapes/
    image27.jpg
is a subpath of the stage URL
s3: //example_bucket/my_images_stage
Furthermore, in at least one embodiment, any user that has usage privileges on the relevant stage is permitted by the data platform 100 to call the function get_relative_path( ).

Function: get_absolute_path( )

Another function that may be provided by the data platform 100 in at least one embodiment is a function that is referred to herein as get_absolute_path( ), which enables users to obtain the absolute path of a given (internal or external) file that is stored on a given internal stage 114 or external stage 120. In at least one embodiment, the function get_absolute_path( ) takes two arguments: (1) the name of an internal stage 114 or an external stage 120 and (2) the relative path of a file that is stored on that internal stage 114 or external stage 120. A call of the function get_absolute_path( ) may take the form of:

```
select get_absolute_path
(
    stage_name,
    'relative_path'
);
```

In at least one embodiment, the function get_absolute_path( ) returns the absolute path of the file on the stage as a string. Continuing the above example scenario in which my_images_stage is an external stage 120, a user may make the following example function call:

```
select get_absolute_path
(
    my_images_stage,
    '/landscapes/image27.jpg'
);
```

In this example scenario, this function call would return the string s3: //example_bucket/my_images_stage/landscapes/
   image27.jpg as the absolute path of that file. The function get_absolute_path( ) may operate at least in part by referencing the my_images_stage object, identifying s3: //example_bucket/my_images_stage as the stage URL of that stage, concatenating that stage URL and the provided relative path in that order, and returning the result of that concatenation operation as a string. In at least one embodiment, any user that has usage privileges on the relevant stage is permitted by the data platform 100 to call the function get_absolute_path( ).

Function: get_presigned_URL( )

Another function that may be provided by the data platform 100 in at least one embodiment is a function that is referred to herein as get_presigned_URL( ), which enables users to obtain what is known as a presigned URL for a given file that is stored on a given internal stage 114 or external stage 120. As is known to those of skill in the relevant arts, a presigned URL, which is also known as a "signed URL" and by other names, is a type of URL that is used to grant (typically temporary) access to an object (e.g., a file) that resides at a specific network location. The application, function, driver, and/or the like that creates a presigned URL for a given file typically includes, in that presigned URL, one or more specific parameters that facilitate the desired limited access to the file.

Building on the above examples in which my_images_stage is an external stage 120, and again using AWS™ syntax by way of example, a presigned URL for the example file 'image27.jpg' might take a form similar to the following:

--- https://example_bucket.s3.amazonaws.com/my_images_stage/landscapes/
image27.jpg?X-Amz-Algorithm=AWS4-HMAC-SHA256&X-Amz-
Credential=E98AWK%2F20200626%2Fus-west-2%2Fs3%2Faws4_request&X-Amz-
Date=20200626T232419Z&X-Amz-Expires=7200&X-Amz-
Signature=67e0c9ef01807d04p76w0460f

---

Other parameters could be included instead of or in addition to one or more of those shown above and described below. For clarity of presentation, the above example presigned URL is shown below with each parameter starting on its own line, whereas an operative version of a presigned URL such as this would be one contiguous string of characters such as is shown above.

--- https://example_buckets3.amazonaws.com/my_images_stage/landscapes/image27.j
pg?
X-Amz-Algorithm=AWS4-HMAC-SHA256 &
X-Amz-Credential=E98AWK [%2F] 20200626 [%2F] us-west-2 [%2F] s3 [%2F]
aws4_request &
X-Amz-Date=20200626T232419Z &
X-Amz-Expires=7200 &
X-Amz-Signature=67e0c9ef01807d04p7 6w0460f

---

The first line (containing the absolute path) ends with the "?" character that conventionally separates the absolute path from one or more parameters in URLs. Also, each parameter line ends with the "&" character that conventionally separates URL parameters from one another. The "?" and each "&" are preceded by a space for visual clarity, though that space would not be there in an operative presigned URL. Additionally, the multiple values in the "X-Amz-Credential" parameter are separated by the 3-character string "%2F,"

which is the URL-encoded version of the forward slash (/) character. And even though there would be no spaces in an operative presigned URL, each "%2F" is enclosed in square brackets that are each preceded and succeeded by a space in the above example simply for a clearer visual presentation. Neither those spaces nor those square brackets would appear in an operative version of this example presigned URL. Moreover, it is noted that the pseudorandom character strings in the "X-Amz-Credential" parameter and the "X-Amz-Signature" parameter could and likely would be longer in a real, fully operative presigned URL: those parameters were shortened to facilitate presentation of this example.

The "X-Amz-Algorithm" parameter being set to "AWS4-HMAC-SHA256" indicates that a Secure Hash Algorithm (SHA) known as "SHA-256" was the hash algorithm that was used to generate the below-described digital signature of this example presigned URL. As known to those of skill in the art, AWS4-HMAC-SHA256, which is also known as "Signature Version 4" "sigv4," "V4," and the like is an authentication scheme that is supported by AWS S3™.

The "X-Amz-Credential" parameter starts with the string "E98AWK," which represents the security credentials (a.k.a. access key, access token, and/or the like) that is embedded in this example presigned URL for accessing the file "image27.jpg." The credential parameter next includes (i) "20200626," which indicates Jun. 26, 2020 as the date on which this example presigned URL was generated; (ii) "us-west-2," which is what is known as the "aws-region string" of the example presigned URL; (iii) "s3," which is what is known as the "aws-service string" of the example presigned URL; and (iv) "aws4_request," which is what is known as the "termination string" of the example presigned URL.

The "X-Amz-Date" parameter is set to "20200626T232419Z," which indicates that the example date and time (i.e., the timestamp) at which this example presigned URL was created is Jun. 26, 2020 at 23:24:19 (i.e., 11:23 p.m. (and 19 hundredths of a second)). This timestamp is expressed in what is known as the International Organization for Standardization (ISO) 8601 format, where the "T" is a delimiter between the date and the time, and where the "Z" represents what is known as the "Zero time zone" in that it is not offset (i.e., it is offset by zero hours) from what is known as the Coordinated Universal Time (UTC) (a.k.a. "Zulu time"). In at least one embodiment, the "X-Amz-Date" parameter is an input into the above-described hash algorithm.

The "X-Amz-Expires" being set to "7200" indicates that this example presigned URL was set to expire 7200 seconds (i.e., 2 hours) after the timestamp described above. In many implementations, an expiration-time field can be omitted from a presigned URL, in which case a default value (e.g., 3600 seconds (i.e., 1 hour)) is imposed. Other default values could certainly be set. Moreover, it would also be possible to implement non-expiring presigned URLs, though this may be less desirable from a security perspective.

Finally, the "X-Amz-Signature" parameter being set to "67e0c9ef01807d04c76a0460f" indicates that that pseudo-random string of alphanumeric characters is the (e.g., hexadecimal-encoded) digital signature, which is a security parameter, of this example presigned URL. This value is typically computed by the hash algorithm that is specified in the above-described "X-Amz-Algorithm" parameter. In some cases, a data item known as a "security policy" is the input to that hash algorithm, along with the above-described timestamp. Other hash algorithms (or another type of algorithm) and/or other inputs could be used to generate digital signatures in various different embodiments.

Returning to the definition of the function get_presigned_URL( ), in at least one embodiment, the function takes either two or three arguments, depending on whether the optional expiration-time parameter is specified. If it is, the function takes three arguments. If it is not, the function takes two arguments. Thus, in at least one embodiment, the arguments of the function get_presigned_URL( ) are (1) the name of an internal stage 114 or an external stage 120, (2) the relative path of a file that is stored on that internal stage 114 or external stage 120, and, optionally, (3) an expiration time (expressed in at least one embodiment as an integer number of seconds). A call of the function get_presigned_URL( ) may take the form of:

```
select get_presigned_URL
(
    stage_name,
    'relative_path'[,
    expiration_time]
);
``` where the "expiration_time" parameter and its preceding comma are shown in single square brackets to indicate that that parameter is optional. In at least one embodiment, get_presigned_URL( ) returns, as a string, a presigned URL for the file that is located in the specified stage at the specified relative path. In some implementations, a specific data type may be defined to contain presigned URLs. Continuing with the above-described example scenario in which my_images_stage is an external stage 120, a user may make the following example function call:

```
select get_presigned_URL
(
    'my_images_stage',
    '/landscapes/image27.jpg',
    7200
);
```

This example function call may result in the function get_presigned_URL( ) returning the above-described example presigned URL for this file. The function get_presigned_URL( ) may operate at least in part by carrying out the functionality of—or simply calling—the function get_absolute_path( ) with the first two parameters that are passed into the function get_presigned_URL( ), and then assembling the presigned URL to have parameters similar to those described above. For example, as part of performing its operations, the function get_presigned_URL( ) may hash a security policy or other value together with a current or future timestamp to derive the digital signature to include in the presigned URL. It is further noted that presigned URLs can be HTTP or HTTPS URLs, and a function such as get_presigned_URL( ) can be implemented either way. In some embodiments, the function get_presigned_URL( ) could be implemented such that the absolute path of a given file is passed into the function instead of both the stage name and the relative path. Other permutations are possible as well. In at least one embodiment, any user that has usage privileges on the relevant stage is permitted by the data platform 100 to call the function get_presigned_URL( ).

Moreover, the function get_presigned_URL( ) can be used in a view. In at least one embodiment, in such a case, the data platform 100 imposes a restriction that the owner role of the view have usage privileges on the associated stage in order for other roles to be able to query the view and get the presigned URL of one or more files. As an example, the following two roles may exist in a given implementation:

a data_engineer role that created a given view, therefore owns it, and has usage privileges on the associated stage; and a data_analyst role that has select privileges on the view, but does not have usage privileges on the stage.

In at least one embodiment, in this scenario, users having the data_analyst role are permitted by the data platform 100 to query the view and get the presigned URL of an associated file. When using internal stages 114 that are server-side-encrypted but not client-side-encrypted, users are able in at least one embodiment to use the function get_presigned_URL( ) to obtain presigned URLs for files for use by human users, and also for use in drivers, applications, services, and/or any other suitable data-handling code.

Table Function: list_files( )

Another function that may be provided by the data platform 100 in at least one embodiment is a function that is referred to herein as list_files( ), which enables a user (e.g., a customer) of the data platform 100 to obtain a list of all of the files in a given internal stage 114 or external stage 120 in the form of a database table. In at least one embodiment, the list_files( ) function is what is known as a "table function," in that it is a function that returns a table object.

The list_files( ) function in this example description takes a single argument: a stage object, which could correspond to either an internal stage 114 or an external stage 120. Other implementations could be used as well, such as implementations in which the function list_files( ) takes a stage name, a stage URL, or another stage identifier. In the example syntax that is used in this disclosure, a stage object is represented by the stage name prepended with the "@" symbol—e.g., @my_images_stage. As stated, in at least one embodiment, the table function list_files( ) returns a table that lists all of the files in the relevant stage. In at least one embodiment, any user that has usage privileges on the relevant stage is permitted by the data platform 100 to call the function list_files( ).

Being a table function in at least one embodiment, the function list_files( ) enables users to take advantage of the table-related features provided by the data platform 100. Thus, as examples, once the file-catalog information is funneled into a table by the list_files( ) function, users can select over that table, filter over that table, create customized views on that table, apply predicates to that table, and/or the like. A call of the function list_files( ) may take the form of:

```
select * from table
(
    list_files
    (
        @stage_name
    )
);
``` where the "table( )" syntax is used by way of example to indicate to the data platform 100 that a table object is what is inside the parentheses in "table( )." Continuing the above example scenario, a user may make the following example function call:

```
select * from table
(
    list_files
    (
        @my_images_stage
    )
);
```

Example results of that function call are described below.

File-Catalog Table: First Example—Outward-Facing Properties

Figure 2:
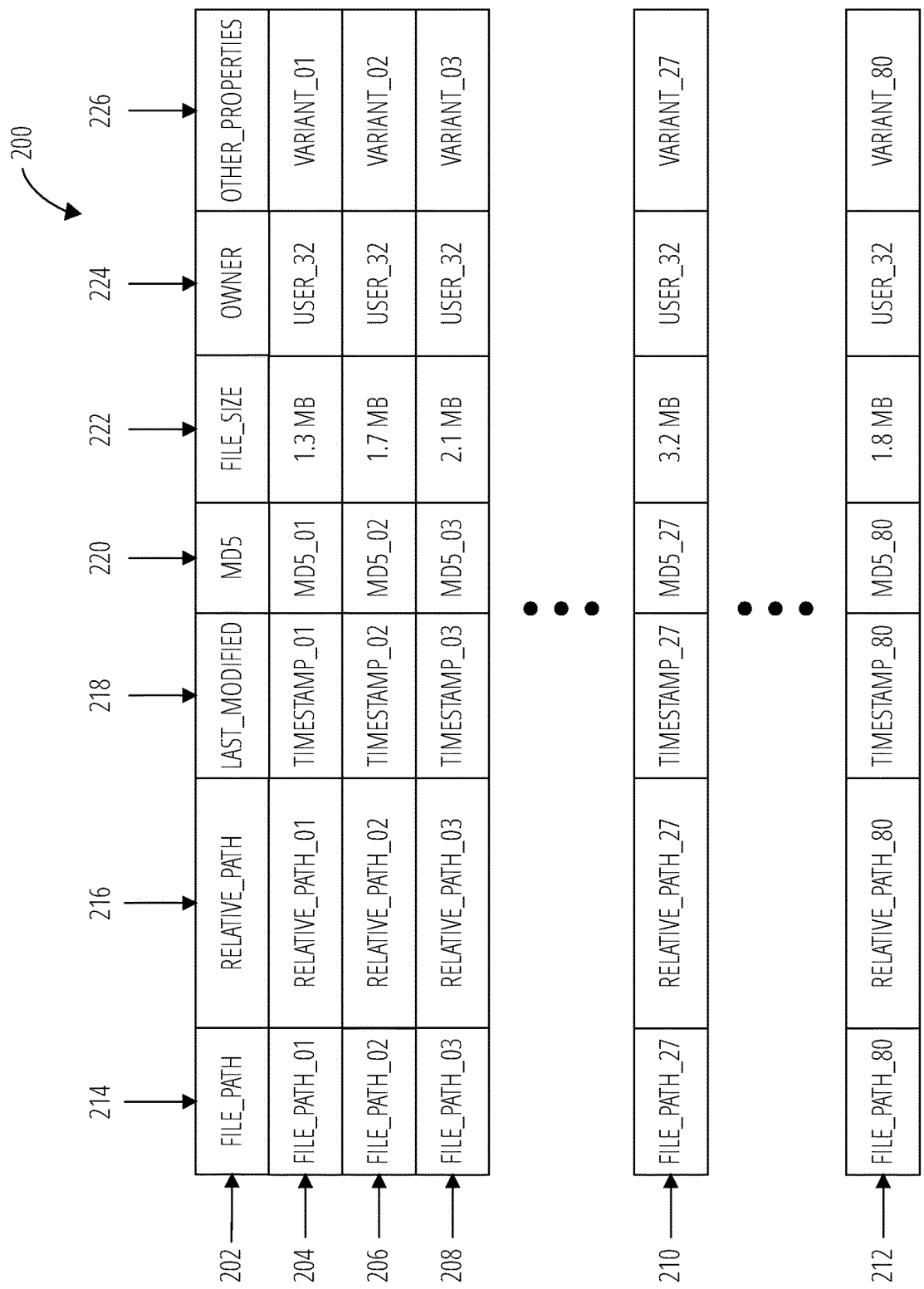
FIG. 2 illustrates a first example file-catalog table, in accordance with at least one embodiment.

The above function call of list_files( ) may return a table such as the example file-catalog table 200 of FIG. 2. In this example scenario, as described above, the external stage 120 named "my_images_stage" on a cloud-storage platform 118 contains two folders: a folder called "landscapes" that contains fifty files that are respectively named "image01.jpg" through "image50.jpg," and a folder called "skylines" that contains thirty files that are respectively named "image51.jpg" through "image80.jpg."

The operator of the cloud-storage platform 118 that includes this example external stage 120 may make certain metadata properties about various files stored on that cloud-storage platform 118 available to users (and data platforms) having access to its storage locations. File-metadata properties of this nature are referred to in this disclosure as "outward-facing properties" of the files, in that they are mostly independent of the content of the files. The file size is of course dependent on (but fairly unindicative of) the content of a given file, especially an unstructured file such as an image file. The function list_files( ) may retrieve these properties and organize them into a table for use by the associated customer of the data platform 100. Some such outward-facing metadata properties are described below in connection with the example file-catalog table 200 of FIG. 2. The file-catalog table 200 is an example, then, of what is referred to herein as an outward-facing-properties file-catalog table.

The file-catalog table 200 could be a table that a customer designs and populates using the list_files( ) function, or, as described more fully below, it could be a table that—e.g., upon the setting of a certain stage property during stage creation—is automatically created, populated, and kept up-to-date by the data platform 100. In the latter case, a table such as the file-catalog table 200 is referred to at times in this disclosure as being "built in" to the data platform 100, being a "built-in table" with respect to the data platform 100, and the like.

As can be seen in FIG. 2, the file-catalog table 200 includes a title bar 202, a row 204, a row 206, a row 208, a row 210, a row 212, a file-path column 214, a relative_path column 216, a last-modified column 218, an MD5 column 220, a file-size column 222, a file-owner column 224, and an other-properties column 226. In this example scenario, each row in the file-catalog table 200 corresponds to a file in the external stage 120 that is named my_images_stage. In the embodiments that are primarily described herein, the file-path column 214 contains (as a string) the absolute path of the associated file on the stage; in other embodiments, the file-path column 214 contains (as a string) the stage URL of the stage. In at least one embodiment, the relative_path column 216 contains (as a string) the relative file path on the stage of the file corresponding to that row.

The last-modified column 218 may contain a timestamp that reflects the date and time at which the file corresponding to that row was most recently modified. The MD5 column 220 may contain (as a string) a, e.g., 128-bit hash value associated with the file corresponding to that row, where that hash value is the output of the MD5 message-digest algorithm. The file-size column 222 may contain (as a number) a file size (in, e.g., megabytes (MB) (as shown), kilobytes (kb), and/or the like) of the file corresponding to that row. The file-owner column 224 may contain (as a string) an identifier of the user that is the owner of the file corresponding to that row. Finally, the other-properties column 226 may contain a variant (e.g., complex) data type that reflects one or more other properties of the file corresponding to that row. Certainly one or more different metadata properties (e.g., a file-creation timestamp) could be included in a table such as the file-catalog table 200 instead of or in addition to one or more of the metadata properties that are shown by way of example in FIG. 2.

With two sets of vertically oriented ellipses used to represent respective sets of non-depicted rows, it can be seen that the file-catalog table 200 includes a row for each of the eighty example files that are collectively stored in the example my_images_stage. In row 204, row 206, row 208, row 210, and row 212, it can be seen that actual example values are shown in the file-size column 222 (e.g., 1.3 MB, 1.7 MB, etc.) and file-owner column 224 (in which "USER_32" is shown as the example owner of each of the explicitly listed files), whereas the values in the other columns are depicted as placeholders that are named after their associated column and that are numbered according to the file that corresponds to their row. For example, row 204 is meant to correspond to the file named "image01.jpg," and it can be seen that row 204 includes values such as "RELATIVE_PATH_01" in the relative_path column 216, "TIMESTAMP_01" in the last-modified column 218, and so forth. These placeholders are there for example presentation and would be replaced by actual metadata-parameter values in an actual implementation.

Row 210 is meant to correspond to the file "image27.jpg" that is used in the above descriptions of the functions get_relative_path( ), get_absolute_path( ), and get_presigned_URL( ). Thus, keeping consistent with the above-described example scenario, the cell in row 210 and file-path column 214 would contain the string:

S3: //example_bucket/my_images_stage/landscapes/image27.jpg and the cell in row 210 and relative_path column 216 would contain the string:

/landscapes/image27.jpg

Finally, row 212 is meant to correspond to the example file "image80.jpg" and represents the last row of the file-catalog table 200. When sorted in the manner depicted in FIG. 2, the absolute paths and relative paths in the first fifty rows of the file-catalog table 200 would include reference to the "landscape" folder and the absolute paths and relative paths in the final thirty rows of the file-catalog table 200 would include reference to the "skylines" folder.

In an example, a user could create the file-catalog table 200 (and name it 'file_catalog_table') using syntax such as:

```
create table file_catalog_table
(
    file_path string,
    relative_path string,
    last_modified datetime,
    md5 string,
    file_size number,
    owner string,
    other_properties variant
)
```

The user could create the file-catalog table 200 in a database in the associated customer account on the data platform 100. In particular, the user could create the file-catalog table 200 as an object inside the same database in which the associated stage is also an object, or in another database. Furthermore, a user could then populate the file-catalog table 200 to substantially the state that is shown in FIG. 2 by using syntax such as:

```
insert into file_catalog_table from
(
    select * from table
    (
        list_files
        (
            @my_images_stage
        )
    )
);
```

Other syntaxes are of course possible as well, as those provided herein are by way of example and not limitation.

File-Catalog Table: Second Example—Content-Dependent Properties

Continuing the example scenario, a user may wish to create a table having columns (e.g., file-metadata properties) that differ from the columns of the outward-facing-properties file-catalog table 200. In an example, a user may wish for these columns to reflect properties related to the content of the various files. In the parlance of this disclosure, file-metadata properties of this type are referred to as "content-dependent properties" of the associated files. For example, a user may be interested in the following list of properties of image files (some of which (e.g., file name and relative path) are actually outward-facing properties):

file name;
image format (e.g., JPG, PNG, etc.);
image width (i.e., x dimension);
image height (i.e., y dimension);
whether or not the image is a drawing (as opposed to, e.g., a photograph);
whether or not the image is a black-and-white image (as opposed to, e.g., a color image);
whether (and which) one or more image tags apply to the image;
the dominant color of the image; and
the relative path of the file on the stage.

To create a content-dependent file-catalog table containing these properties (and named 'image_file_catalog_table'), a user may employ syntax such as:

```
create table image_file_catalog_table
(
    file_name string,
    image_format string,
    x_dimension number,
    y_dimension number,
    is_drawing Boolean,
    is_black_and_white Boolean,
    tags array,
    dominant_color string,
    file_URL string
)
```

It is noted that, not only does this table include a column for each of the image properties listed above, it also includes a column ("file_URL") in which the relative path of the associated file is stored as a string. In this example, the name "file_URL" is used in the schema of the table called image_file_catalog_table even though that column in the table will be populated, as shown below, with relative paths (as opposed to absolute paths) of files. This naming choice is made because the example image-processing function—that is explained below as being used in preparing JSON files for use in populating the table—stores absolute paths under the same label, i.e., "file_URL."

To populate the table image_file_catalog_table, the user could first employ an image-processing function (e.g., an AWS™ LAMBDA™ function, an AZURE® AUTOMATION™ function, and/or the like) on the files on my_images_stage to create a list of JSON documents stored in my_images_stage, for example one JSON document for each image file (or one JSON document containing multiple respective records, one for each image file, among other possible implementations), in which metadata properties of the image files are recorded in a semi-structured format. For the file "image27.jpg," the corresponding JSON document may include the following text:

```
{
    "file_name" : "image27.jpg",
    "image_format" : "JPG",
    "x_dimension" : 1024,
    "y_dimension" : 768,
    "is_drawing" : true,
    "is_black_and_white" : true,
    "tags" :
    {
        "trees",
```

```
    "clouds",
    "farmhouse",
    "horses"
  },
  "dominant_color" : "gray",
  "file_URL" : "s3://example_bucket/my_images_stage/landscapes/image27.jpg"
}
```

The user may then populate the image_file_catalog_table by employing a command such as:

```
copy into image_file_catalog_table
from
(
  select
    $1:file_name,
    $1:image_format,
    $1:x_dimension,
    $1:y_dimension,
    $1:is_drawing,
    $1:is_black_and_white,
    $1:tags,
    $1:dominant_color,
    get_relative_path('@my_images_stage', $1:file_URL)
  from
    @my_images_stage
)
file_format = (type = JSON)
``` where the "$1" is an example of syntax that could be used to represent the first column (e.g., data set) in each file in a given stage. This command will be applied to all JSON documents on my_images_stage.

Figure 3:
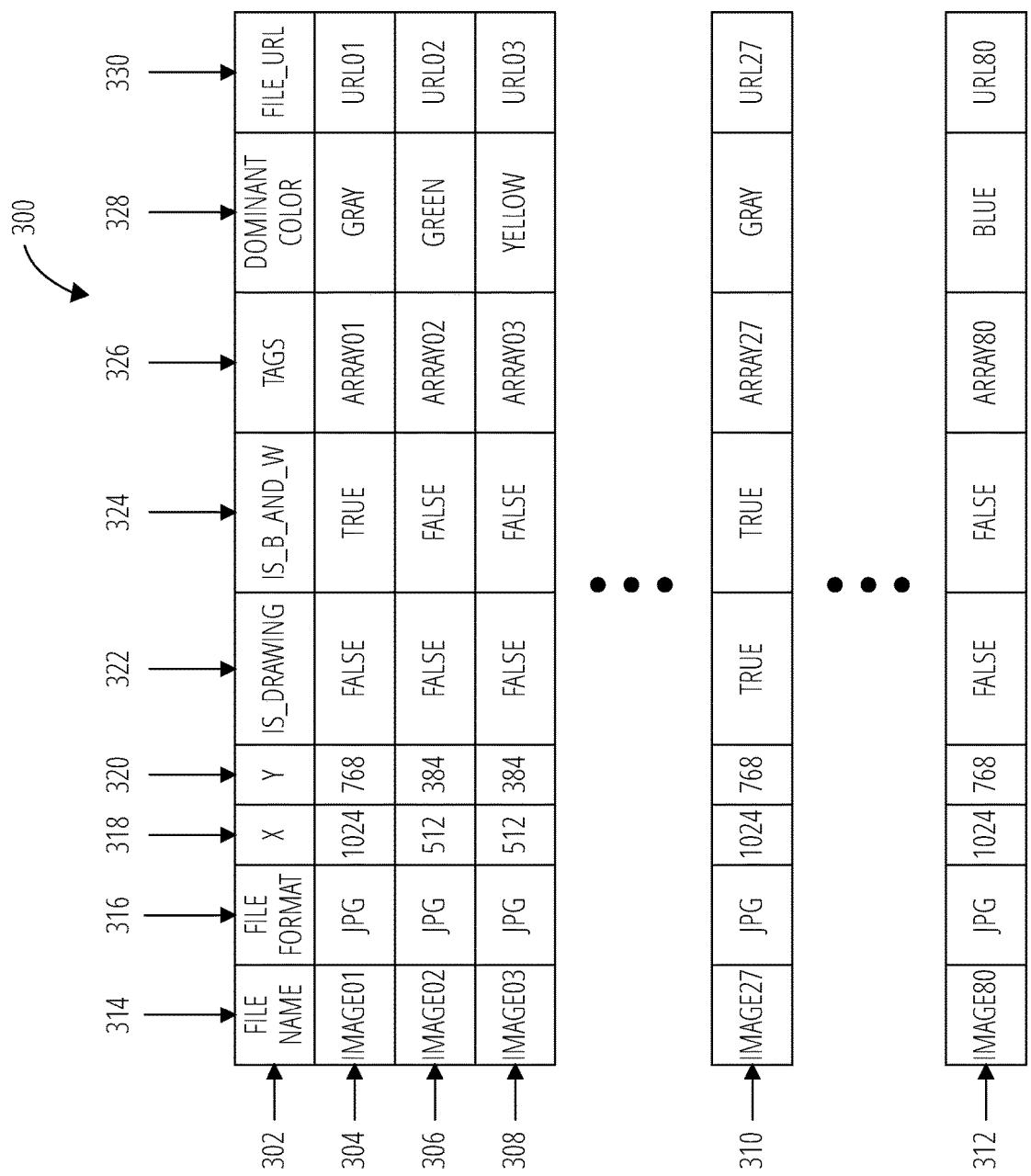
FIG. 3 illustrates a second example file-catalog table, in accordance with at least one embodiment.

In at least one embodiment, the result of the above "copy into" command is the table named image_file_catalog_table being populated as shown in the example file-catalog table 300 that is depicted in FIG. 3. It is noted that FIG. 2 and FIG. 3 depict parallel rows—i.e., each of those two figures depicts rows corresponding to the sample files "image01.jpg," "image02.jpg," "image03.jpg," "image27.jpg," and "image80.jpg." Furthermore, rows in FIG. 3 that are numbered in the 300 series correspond to the same example image files as similarly numbered rows in the 200 series in FIG. 2. For example, row 210 in FIG. 2 and row 310 in FIG. 3 both correspond to the example file "image27.jpg." And similar to the file-catalog table 200, in the file-catalog table 300, some cells contain actual example values (e.g., 1024, green, etc.) while some cells contain placeholders (e.g., "array03," "URL02," etc.).

The file-catalog table 300 includes a title bar 302, a row 304, a row 306, a row 308, a row 310, a row 312, a file-name column 314, a file-format column 316, an x-dimension column 318, a y-dimension column 320, an is-drawing column 322, an is-black-and-white column 324, a file-tags column 326, a dominant-color column 328, and a file-URL column 330. In at least one embodiment, in a given row, the file-name column 314 contains the name of the corresponding file (as a string, shown in FIG. 3 without the ".jpg" extension), the file-format column 316 contains the image format of the corresponding file (as a string), the x-dimension column 318 contains the x dimension of the corresponding file (as an integer number of pixels), the y-dimension column 320 contains the y dimension of the corresponding file (as an integer number of pixels), the is-drawing column 322 contains a Boolean value indicative of whether the corresponding file is a drawing, the is-black-and-white column 324 contains a Boolean value indicative of whether the corresponding file is a black-and-white image, the file-tags column 326 contains an array of one or more tags indicative of content (e.g., depicted objects) in the corresponding file, the dominant-color column 328 contains the dominant color in the corresponding file (as a string), and the file-URL column 330 contains the relative path of the corresponding file (as a string). The file-URL column 330 contains relative paths due to the inclusion of the function get_relative_path( ) in the above "copy into" statement.

If, for example, a user then wanted to obtain a presigned URL for each of the black-and-white non-drawings (e.g., black-and-white photographs) in the stage my_images_stage, the user could run a command such as:

```
select get_presigned_URL
(
  @my_images_stage,
  file_URL
) as presigned_URL
from
  image_file_catalog_table
where
  is_black_and_white = true
AND
  is_drawing = false
;
```

This command would return a one-column relation, where the column is named "presigned_URL," containing a presigned URL for each of the files that correspond to rows in image_file_catalog_table (i.e., in the file-catalog table 300) in which the corresponding image file had been determined to be both a black-and-white image and not a drawing. A user could then click on any one or more of those presigned URLs to access (e.g., download) the actual image files, since the presigned URLs would include access tokens to grant temporary access to the corresponding files. Certainly many other example commands could be listed here as well. In embodiments in which my_images_stage was created with its encryption property set to "SSE," those downloaded files would be unencrypted (in some cases once they emerge from an HTTPS/TLS or similar connection used in transit). Using commands such as these, customers can generate tables, views, and/or the like to store presigned URLs and other file metadata. Customers can then run queries on such tables, views, etc., unlocking the power of the data platform 100 as applied to their files stored on (internal or external) stages.

Pipelines for File-Metadata Ingestion

Furthermore, in accordance with various embodiments of the present disclosure, users (e.g., customers) of the data platform 100 can readily develop pipelines for automated ingestion into their account on the data platform 100 of metadata pertaining to files stored on stages. Some features of various embodiments that facilitate the construction of such pipelines are described below. As above, the examples that are described below relate to an external stage 120.

API Integration

One such feature of the data platform 100 that contributes to enabling customers to build file-metadata-ingestion pipelines is known as API integrations. As used herein, in at least one embodiment, an API integration is an account-level object that defines the manner in which a user having a given role (that itself has sufficient privileges) would interact with an HTTPS proxy service that may be provided by a given cloud-storage platform 118 such as AWS™, AZURE® and/ or the like. As above, AWS™ examples are presented here for illustration.

In at least one embodiment, an API integration is the mechanism by which a given external API/function is made available as a table function in the data platform 100. An example syntax for creation of such an API integration could take the form of:

```
create API integration get_metadata_api_integration
enabled = true
allowed_URLs =
(
  'https://[example_server]/default/get-image-metadata',
  'https://[example_server]/default/get-pdf-metadata'
)
``` where "example_server" could be a server on the associated cloud-storage platform 118.

This example API integration is named "get_metadata_api_integration" and, as shown in the two examples of allowed URLs, can be used in connection with retrieving metadata related to image files and metadata related to PDF files. Certainly other types of files could be included as well or instead of these example types. The specification of one or more allowed URLs for a given API integration is one example way to control which one or more URLs can be navigated to when using the corresponding API integration for an external function, as described more fully below. Thus, within a given API integration, the "allowed URLs" is a permitted-URLs list of the one or more URLs that are permitted under that API integration. A given allowed URL may correspond to an external function developed in, e.g., AWS™. API integrations in general may be a way to formalize and effectively manage interactions between the data platform 100 and one or more external functions. In at least one embodiment, once the above example API integration has been created, the data platform 100 is able to authenticate with the REpresentational State Transfer (REST) API of the associated cloud-storage platform 118. After this, users can create and/or access the external function to get image metadata.

External Function

The example customer may, before or after creating the above-described example API integration, create an associated external function for use in connection with that API integration. While two example functions ("get-image-metadata" and "get-pdf-metadata") were referenced above in the syntax used to create the example get_metadata_api_integration, it is the first of those two that is focused on here. The customer may create an "external function" object to reference that external function using syntax such as:

```
create external function get_image_metadata_ext_function
(
  presigned_URL string
)
returns
  variant
api_integration = get_metadata_api_integration
as
'https://[example_server]/default/get-image-metadata'
;
```

As can be seen in this example, the external-function object that is being created sets 'get_metadata_api_integration' as its API integration and selects the displayed URL from among the two allowed URLs in that API integration as being the URL for this particular example external-function object, which is named 'get_image_metadata_ext_function.' Furthermore, this external-function object takes a single (string) argument: a presigned URL for a file on the associated stage. The actual external function that is implemented on the cloud-storage platform 118 could operate in a manner similar to the "image-processing function" that is discussed above (in that case in the context of producing JSON files). Indeed, this example external function may produce and then return a variant that includes semi-structured content similar to the example JSON file shown above, such that the below-described task could read individual fields from that returned variant.

Figure 4:
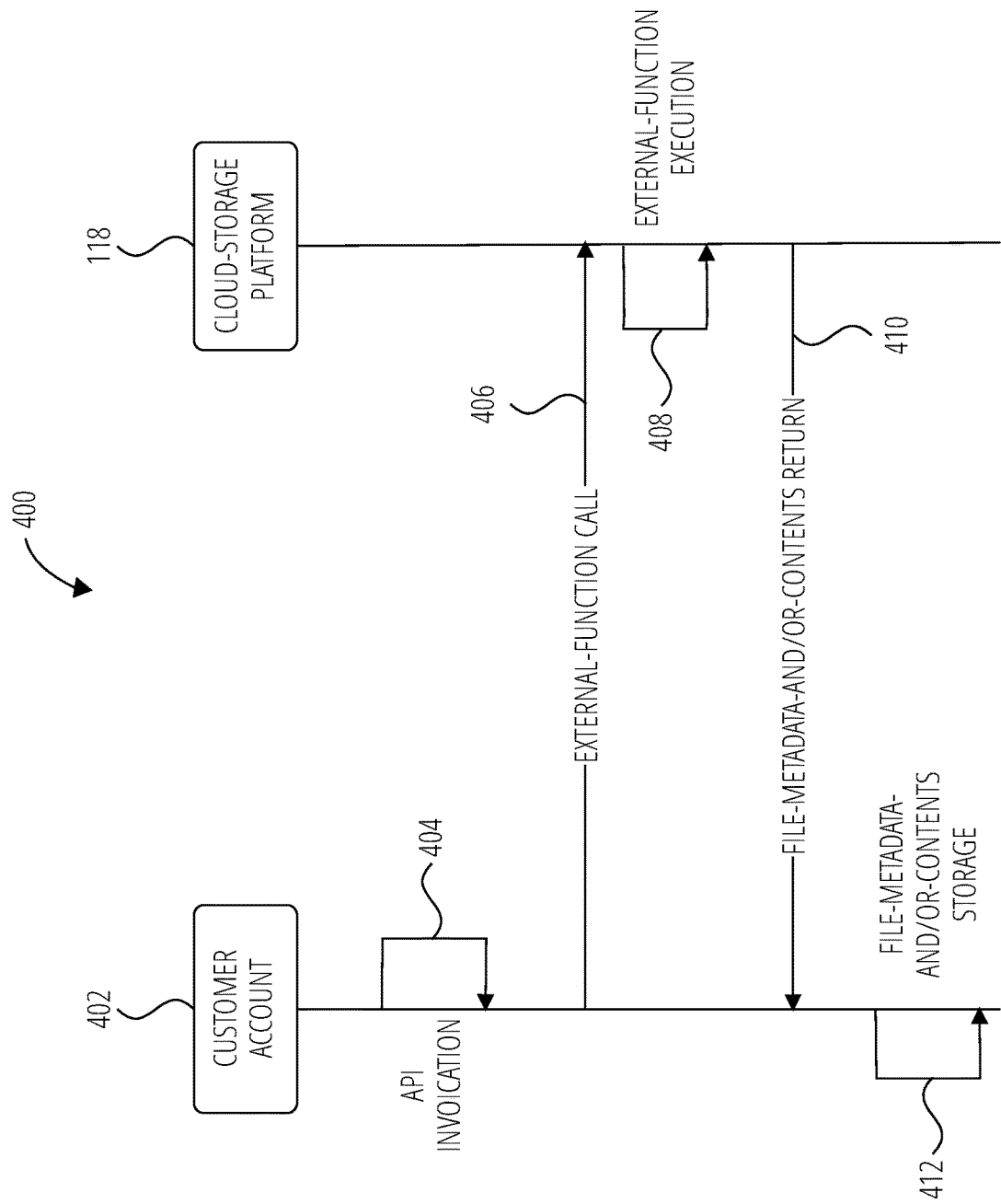
FIG. 4 illustrates an example message flow, in accordance with at least one embodiment.

FIG. 4 shows an example message flow 400 in which a customer account 402 at the data platform 100 is used to invoke an API to call an external function. A user in the customer account 402 makes an API invocation 404, which results in an external-function call 406. The external-function call 406 results in the cloud-storage platform 118 carrying out an external-function execution 408, which in turn results in a file-metadata-and/or-contents return 410 from the cloud-storage platform 118 to the customer account 402. Following the file-metadata-and/or-contents return 410, the customer account 402 carries out a file-metadata-and/ or-contents storage 412. The external-function call 406 and the file-metadata-and/or-contents return 410 could be accomplished using one or more HTTP/TLS connections. Further details regarding the manner in which one or more of these steps could be carried out are discussed below. For example, the execution of a task that references a stream on a table or stage could involve the API invocation 404 and the external-function call 406, which in turn result in the external-function execution 408, the file-metadata-and/or-contents return 410, and the file-metadata-and/or-contents storage 412.

Stream

Once the above-described API integration and external-function object have been created, the customer can continue the construction of a file-metadata-ingestion pipeline by creating what is known as a stream, in this case a stream on the table named image_file_catalog_table (i.e., the table depicted as the file-catalog table 300 of FIG. 3), using syntax such as:

create stream image_file_catalog_stream
on
table image_file_catalog_table;

This example stream may be referred to as a "table stream," in that it is a stream that is created on a particular table, in this case image_file_catalog_table, which is referred to as the "source table" for the created stream, which, as shown above, is named image_file_catalog_stream. As a general matter, a stream records datamanipulation-language (DML) changes made to a table, including information about inserts, updates, and deletes. That information is also referred to in the art as change-data-capture (CDC) information. The manner in which this created stream could be used in example embodiments is further described below.

Task

The example customer could continue constructing the above-referenced file-metadata-ingestion pipeline by creating a task object named 'image_file_metadata_task' using syntax such as:

```
create task image_file_metadata_task
warehouse = my_warehouse
as
insert into image_file_catalog_table
(
   select
      get_image_metadata_ext_function(file_URL):file_name,
      get_image_metadata_ext_function(file_URL):image_format,
      get_image_metadata_ext_function(file_URL):x_dimension,
      get_image_metadata_ext_function(file_URL):y_dimension,
      get_image_metadata_ext_function(file_URL):is_drawing,
      get_image_metadata_ext_function(file_URL):is_black_and_white,
      get_image_metadata_ext_function(file_URL):tags,
      get_image_metadata_ext_function(file_URL):dominant_color,
      get_relative_path('@my_images_stage', file_URL)
   from
      image_file_catalog_stream
   where
      metadata$action = 'insert'
)
;
```

The syntax "merge into" can be used instead of "insert into" in the above task-creation command in at least one embodiment. Moreover, it is noted that the condition "where metadata$action='insert'" is an example of how the "metadata$" prefix is available in some embodiments of the data platform 100 to reference metadata that is identified, controlled, and made available by the data platform 100. In at least one embodiment, customers can use such syntax but cannot alter or delete the associated metadata items (e.g., metadata columns).

In at least one embodiment, at least two "metadata$" columns are provided by the data platform 100: "metadata$action" and "metadata$is_update." Moreover, at least two "metadata$action" values are supported in an embodiment: 'insert' and delete.' Others could be supported as well. The metadata$is_update column may store a Boolean value indicating whether the metadata$action (of 'insert' or 'delete') in the corresponding row in the table stream was part of an update to one or more rows in the source table (i.e., in image_file_catalog_table). Such an update may correspond to a file being replaced on the cloud storage, which, in at least one implementation, triggers both a delete notification and an insert notification.

In at least one embodiment, whenever the task is executed, it will retrieve metadata for each newly inserted image file in the stage and insert that retrieved metadata into the table named image_file_catalog_table, along with inserting the result of the get_relative_path( ) function shown above into the file-URL column 330. In at least one embodiment, the above task will make only a single call to the above-defined external function named 'get_image_metadata_ext_function.' It is noted that the files processed by a given external function can be internal files or external files.

In the case of internal files, in some embodiments, such files can be processed by JavaScript procedures and/or Java functions.

Stage Enhancements

This section of the disclosure describes several enhancements that are available during external-stage creation in accordance with at least one embodiment.

Built-In File-Catalog Table

In at least one embodiment, when creating either an internal stage 114 or an external stage 120, a user can elect to instruct the data platform 100 to create a built-in file-catalog table, which may have a schema (and example content) similar to what is depicted and described herein in connection with the file-catalog table 200 of FIG. 2, but would instead be managed and controlled by the data platform 100, while still being available to users (e.g., customers). Thus, in at least one embodiment, a customer would not have permissions to alter a built-in file-catalog table, drop (i.e., delete) a built-in file-catalog table, and the like, and the schema of the table is defined by the data platform 100. In some embodiments, a special type of stage (other than simply "internal" and "external") could be implemented for stages that include a built-in file-catalog table, though that is not the type of embodiments that are described below.

Moreover, in some embodiments, a file-catalog table (e.g., a built-in file-catalog table) includes references to files not just in one (e.g., external) stage, but in multiple different stages that could be internal and/or external. In some embodiments, a file-catalog table includes listing of files in stages across multiple cloud-storage platforms. In some such instances, at least one of the multiple cloud-storage platforms may implement different syntax and/or different outward-facing metadata properties with respect to files stored thereon as compared with at least one other of the multiple cloud-storage platforms. The data platform 100 may standardize such differences to produce a unified presentation to its users. The implementation of multi-cloud file-catalog tables is useful in use cases such as deduplication of data across cloud stages, searching metadata across cloud stages, taking inventory of data assets across cloud stages, and/or the like.

Returning to the present example, in at least one embodiment, the user may elect the option of having the data platform 100 create a built-in file-catalog table in an internal stage 114 using syntax such as the following when creating the stage:

```
create stage <my_images_stage>
encryption = (type = SSE)
store_file_catalog = true
```

Thus, the user can elect this option by setting a flag such as store_file_catalog to true. If the user does not want to elect this option, the user could set store_file_catalog to false. In some embodiments, if the user does not specify a value for a flag such as store_file_catalog, a default value (which could be true or false in various different implementations) is selected for the user. For an external stage 120, the user may elect the option of having the data platform 100 create a built-in file-catalog table using syntax such as the following:

```
create stage <my_images_stage>
stage_URL = 's3://example_bucket/my_images_stage'
store_file_catalog = true
```

In at least one embodiment, when store_file_catalog is set to true for either an internal stage 114 or an external stage 120, the data platform 100 responsively creates a built-in file-catalog table for the stage and stores the file catalog in that table. The data platform 100 may create the built-in file-catalog table as an object inside the same database in which the associated stage is also an object, or in another database. As stated, the built-in file-catalog table could have the same schema as the file-catalog table 200 (named 'file_catalog_table' in this disclosure), which is also the example schema presented herein for the list_files( ) function. In at least one embodiment, once the store_file_catalog flag has been set to true (during or, in some embodiments, after, stage creation), the data platform 100 does not permit the user to change that value; in other embodiments, the data platform 100 does permit the user to change that value, in which case the data platform 100 may delete the built-in file-catalog table from the associated stage. In at least one embodiment, in stages that have a built-in file-catalog table, users can select from this table, create views on this table, and/or the like.

Thus, in at least one embodiment, the structure of a built-in file-catalog table includes, like the file-catalog table 200 and file-catalog table 300 discussed above, a row that corresponds to each file in the associated stage. The structure in at least one embodiment also includes a number of columns that include metadata about the files. These could be the same columns that are shown in the file-catalog table 200, for example, and those would be the columns that, in at least one embodiment, would be returned if a user did a "select *" from the built-in file-catalog table.

In at least one embodiment, the data platform 100 (i) maintains one or more platform-controlled metadata columns that are associated with files that are referenced in the built-in file-catalog table and (ii) grants access to the one or more platform-controlled metadata columns using a syntax such as the "metadata$" syntax described above. In some embodiments, the data platform 100 maintains at least the following platform-controlled metadata columns in association with the files that are referenced in the built-in file-catalog table, in some cases in addition to one or more others:

metadata$filename
metadata$relative_path
metadata$presigned_URL where the 'metadata$filename' column may contain the name of the file corresponding to that row, the 'metadata$relative_path' column may contain the same string as would be returned by the function get_relative_path( ) when called with its arguments set to (i) the name of the associated stage and the (ii) absolute path of the file corresponding to that row in the built-in file-catalog table, and the 'metadata$presigned_URL' column may contain the same string (i.e., the same presigned_URL) that would be returned by the function get_presigned_URL( ) when called with its arguments set to (i) the name of the associated stage and (ii) the relative path on that stage of the file corresponding to that row in the built-in file-catalog table.

In addition to implementing these columns, the data platform 100 may also implement such "metadata$" columns in the context of tables that are populated using the list_files( ) function. To illustrate this possibility, FIG. 5 shows an example file-catalog table 500 that is identical to the file-catalog table 300 of FIG. 3 other than that (i) the reference numbers are in the 500 series instead of the 300 series and (ii) the file-catalog table 500 includes (a) a relative-path metadata column 532 that would correspond to the syntax "metadata$relative_path" and (b) a presigned-URL metadata column 534 that would correspond to the syntax "metadata$presigned_URL."

Figure 5:
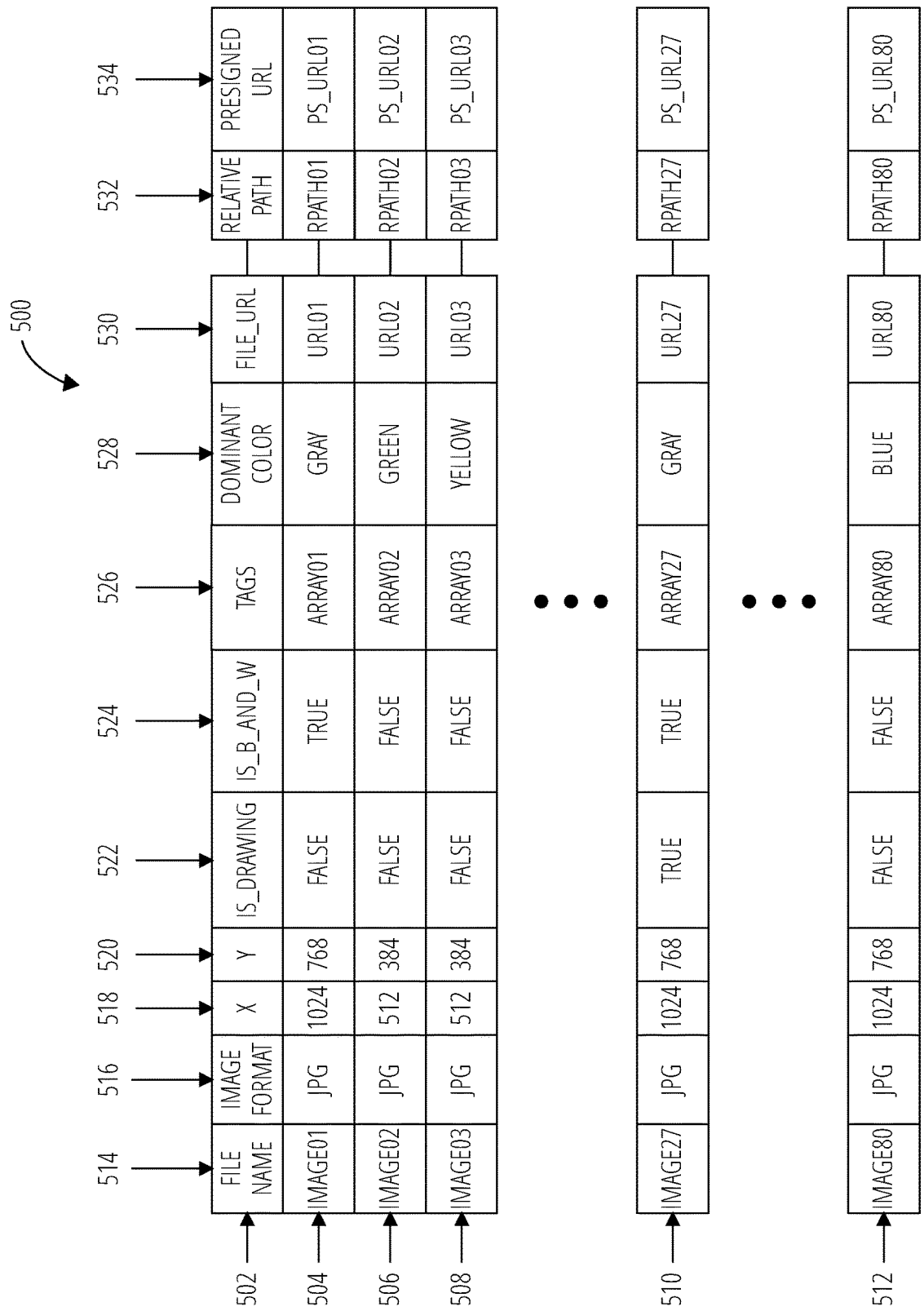
FIG. 5 illustrates a third example file-catalog table, in accordance with at least one embodiment.

The relative-path metadata column 532 and the presigned-URL metadata column 534 are shown in FIG. 5 as being offset from the main body of the file-catalog table 500 by horizontal connecting lines to illustrate their "meta" relation to the rest of the file-catalog table 500. In at least one embodiment, statements such as "select * from [the file-catalog table 500]" would not result in values from the relative-path metadata column 532 or the presigned-URL metadata column 534 being returned, in that those columns in at least one embodiment would need to be expressly requested in order to be returned. In general, in at least one embodiment, the "metadata$" columns only show up in statement results if explicitly included in such statements (e.g., "select metadata$presigned_URL from . . . "). Moreover, a similar version of the file-catalog table 200, which could be a built-in file-catalog table, could be shown as including those "metadata$" columns.

With respect to the metadata$presigned_URL column (e.g., the presigned-URL metadata column 534), due to the time-sensitive nature (i.e., the expiration time) of most presigned URLs, the data platform 100 may periodically refresh that column, or may be configured to generate a new presigned URL (by, e.g., calling the function get_presigned_URL( )) whenever a statement that includes 'metadata$presigned_URL' is executed. Other implementations are possible as well. In most implementations, a new timestamp could not simply be substituted into a given presigned URL, since that timestamp value is typically an input into the hash algorithm that is used to generate the access token in the presigned URL.

Command: Refresh

In at least one embodiment, the data platform 100 provides a "refresh" command that can be used in connection with, e.g., a built-in file-catalog table. This command is usable in various embodiments for realizing an "auto-sync" functionality for a built-in file-catalog table. In at least one embodiment, the built-in file-catalog table is populated using the refresh command, which could have syntax such as:

alter stage stage_name refresh [sub_path];

As shown, the refresh command makes use of an "alter" command, and has an optional sub-path parameter. In an embodiment, if the sub-path parameter is provided, it specifies a relative path to the stage location, and the refresh command will only refresh the built-in file-catalog table for all files under the specified sub-path. Thus, using the example scenarios described above, a user could issue a command such as:

alter stage my_images_stage refresh;

or alter stage my_images_stage refresh '/landscapes';

The refresh command can be used for bootstrapping the built-in file-catalog table, initial population of the built-in file-catalog table, and/or the like. Moreover, unique identifiers for stages other than stage names could be used in different implementations of the refresh command. The command functions to refresh all of the specified rows of the built-in file-catalog table.

The refresh command could be used a first time to capture all files already in a stage, and could be used one or more times (e.g., periodically and/or in response to one or more defined triggers (e.g., a customer's system or the associated storage platform experiencing an outage, an authentication issue with respect to an associated external stage 120, etc.)) to cause the built-in file-catalog table to be restored from source. In a typical implementation, then, the information in the built-in file-catalog table is redundant in that it reflects the collection of files that are actually on a given stage. As an analogy, if a phone book were lost, the various residents are still in their houses, though it would likely be quite an expensive and time-consuming endeavor to recreate the phone book. Similarly, a refresh command could be a computationally expensive and time-consuming operation depending on the number of files on the stage or in the specified sub-path.

Notification Integration

In at least one embodiment, the data platform 100 provides an option during stage creation to specify that the stage being created includes what is known as a notification integration, which in at least one embodiment is an account-level object that provides an interface between the data platform 100 and third-party notification services (e.g., third-party cloud message-queuing services); thus, a given notification integration may define how the data platform 100 interfaces and interacts with a given third-party notification service. A notification-integration stage property may be enabled during creation of an internal stage 114 using syntax such as:

create stage my_images_stage
encryption=(type=SSE)
store_file_catalog=true
notification_integration='image_file_catalog_notification_integration'

In at least one embodiment, the notification-integration stage property is optional and, if included during stage creation, enables the property and creates a notification integration having the specified name. A user may enable the notification-integration stage property for an external stage 120 using syntax such as:

create stage <my_images_stage>
stage_URL = 's3://example_bucket/my_images_stage'
store_file_catalog = true
notification_integration = 'image_file_catalog_notification_integration'

The data platform 100, in at least one embodiment, responds to the notification-integration stage property being enabled for a given stage by creating a pipe and reading notifications from an auto-ingest infrastructure of the data platform 100. In at least one embodiment, for each file-put notification, the data platform 100 inserts a record about the new file in the built-in file-catalog table. Moreover, in at least one embodiment, for each file-delete notification, the data platform 100 deletes the corresponding record from the built-in file-catalog table. In at least one embodiment, the data platform 100 imposes a constraint on the notification-integration stage property, which is that the created notification integration is the same for the cloud-storage platform 118 as it is for the stage.

Creation of Stream on Stage and Task on Stream

Furthermore, in at least one embodiment, the data platform 100 facilitates the above-mentioned auto-sync capability for the built-in file-catalog table by creating a stream on the built-in file-catalog table. In at least some such embodiments, when a new file shows up in the stage, the data platform 100 recognizes that and catalogs it, promoting an ongoing synced relationship between the contents of the built-in file-catalog table and the actual files present on the associated stage. This functionality enables use of the CDC capabilities of stream objects provided in at least some embodiments by the data platform 100. Embodiments that make use of this functionality therefore take advantage of table streams provided by the data platform 100 and limit processing in many instances to newly inserted files and/or updated files. The customer may use syntax such as:

create stream stream_name
on
stage stage_name;

For example, assuming that my_images_stage was created with store_file_catalog set to true, the customer could use syntax such as:

create stream image_file_catalog_stream
on
stage my_images_stage;

In at least one embodiment, the schema of the created stream is the same as that of the built-in file-catalog table, along with the two extra columns metadata$action and metadata$is_update as described above.

The customer could then create a task on this stream similar to the example given above. In this manner, the customer could automatically keep the file-catalog table in sync with the actual current inventory of files in the stage. The stream in at least one embodiment uses its CDC capabilities to identify which one or more files are added to the associated stage, updated in the associated stage, and/or removed from the associated stage, thus enabling change tracking on the file catalog (i.e., the built-in file-catalog table) that is stored for the stage.

Moreover, in some embodiments, customers could implement code to keep a table such as the file-catalog table 300 (or the file-catalog table 500) up-to-date based on changes to the built-in file-catalog table. Thus, a customer could use the addition or updating of one or more files as reflected in the built-in file-catalog table or the stream on that table as a trigger to call an external function to reprocess the added/updated files to keep the file-catalog table 300 (or the file-catalog table 500) current. Similarly, deletions to the file-catalog table 200 could be used as triggers to make parallel deletions from the file-catalog table 300 (or the file-catalog table 500). Such implementations may be useful in handling the fact that many files are different from one another and many customers are interested in different sets of metadata parameters regarding their files, and, as such, customers may design many different tables like the file-catalog table 300 (or the file-catalog table 500). Having a standard schema for the list_files( ) function and/or the built-in file-catalog table provides a standard springboard off of which customers can implement customizations. Additionally or instead, the data platform 100 could provide one or more tables that are derivatives of the built-in file-catalog table. Other implementations are possible as well.

Example Use Case: File Sharing

The presently disclosed systems and methods provide numerous customizations that could be implemented. In this section, the term "file-catalog table" is used to mean any table similar to the file-catalog table 200 (whether built-in or generated using the list_files( ) function or another similar function), the file-catalog table 300, the file-catalog table 500, and/or the like. With file-catalog information for stages formalized in database-table structures (i.e., file-catalog tables) as described herein, customers are able to, as discussed, perform powerful database operations with respect to one or more of their file-catalog tables. Such database operations include running queries, generating views, and the like. One example use case is discussed below.

This use case relates to enabling customers to share files in a secure way. In accordance with at least one embodiment, a customer could create a customized view over a given one of its file-catalog tables. In this example, the files are not image files but instead are medical records for multiple different patients in the form of PDF files. In this example, the customer (e.g., a medical-records company) creates a derivative file-catalog table similar to the file-catalog table 500 in which there is a field for patient number (e.g., a unique identifier of a given patient, as multiple patients can have the same name). In this example, there is also a field that indicates which hospital a patient is (or was) in. Further to this example, the aforementioned derivative file-catalog table contains patient records across multiple hospitals. The customer could create a view that (i) is limited to patients that are (or were) in one particular hospital and (ii) includes presigned URLs (from making use of either the function get_predesigned_URL( ) or the metadata column meta-data$presigned_URL) for each PDF file for the associated patients that are (or were) in that one particular hospital. The customer can then simply share that view with the particular hospital and thereby properly provide, to that particular hospital, access to only their records, protecting the privacy of patients that are (or were) in one or more other hospitals by keeping those files out of reach of the particular hospital with which the view was shared in this example, and protecting the privacy of patients associated with that one particular hospital due to the high security and time-limited nature of presigned URLs.

This type of implementation is a meaningful advance over current implementations in which, for example, files are stored with a date prefix and can only be shared using expressions on those naming-convention date prefixes, which does not account for the facts that, as examples, patients associated with a given hospital would likely have records from multiple dates and patients associated with multiple different hospitals would likely have records from the same date. The creation of a secure view on top of a file-catalog table as described herein addresses this use case very effectively. This is a way of realizing an authorization system built on top of a file-catalog table. Moreover, it is contemplated that different list_files( ) functions and different built-in file-catalog tables could be provided by the data platform 100 for different customers, so a use case such as this could be with respect to a derivative table as discussed above, a list_files( )-generated table, a built-in file-catalog table, and/or another type of file-catalog table.

Figure 6:
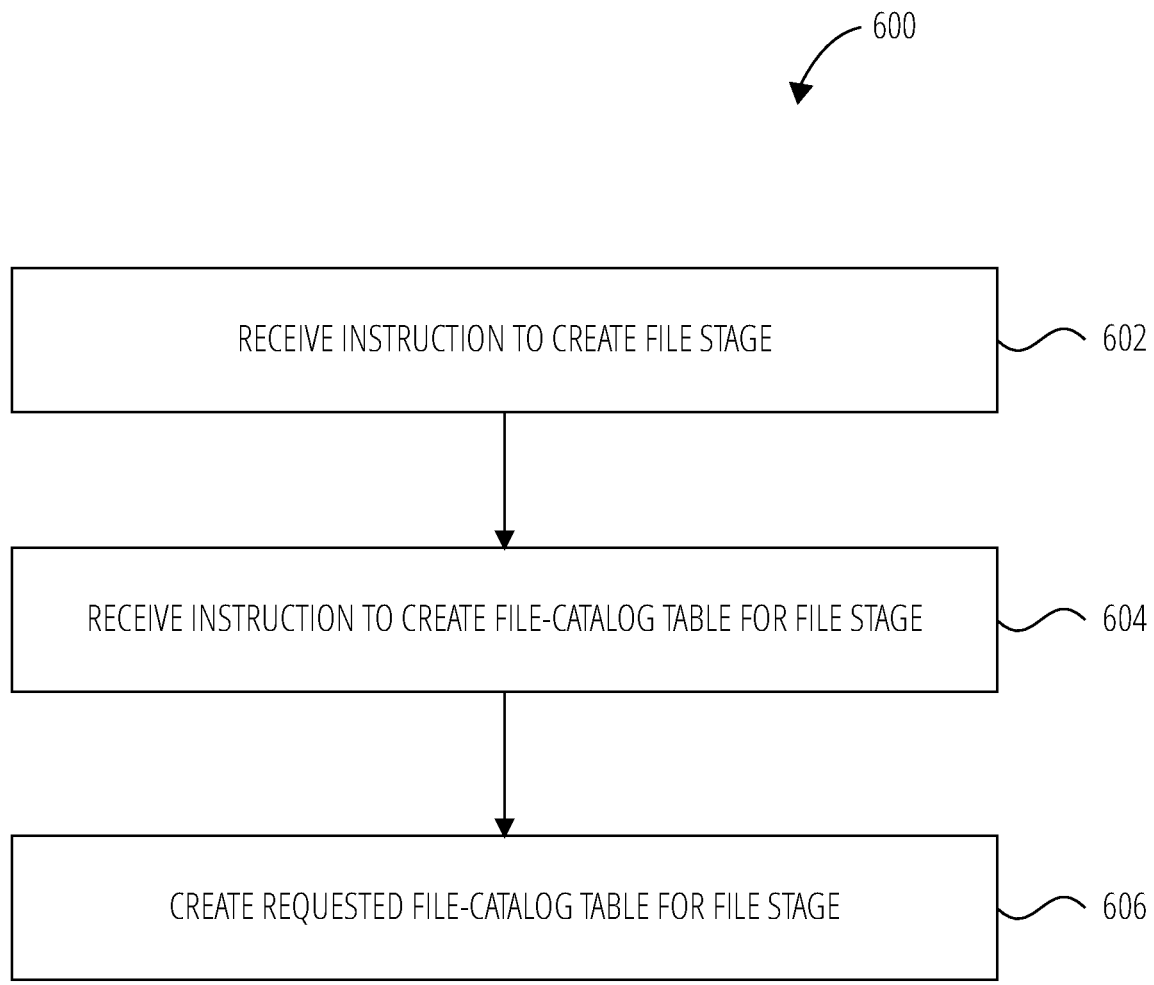
FIG. 6 illustrates an example method, in accordance with at least one embodiment.

FIG. 6 illustrates an example method 600, in accordance with at least one embodiment. In various different embodiments, the method 600 could be performed by any computing and communication device or system of such devices that is suitably programmed or otherwise arranged to perform the operations described herein. In some embodiments, all or part of the method 600 is performed by the database manager 102, which may involve one or more aspects of the method 600 being performed by the resource manager 104, one or more aspects of the method 600 being performed by the execution platform 106, and/or one or more aspects of the method 600 being performed by one or more other functional components of the database manager 102. By way of example and not limitation, the method 600 is described below as being performed by the database manager 102 of the data platform 100.

At operation 602, the database manager 102 receives a stage-creation instruction from a client 116. The stage-creation instruction requests creation by the data platform 100 of creation of a file stage for a user (e.g., customer) account on the data platform 100, where the user account is associated with the client 116. The file stage could be an internal stage or an external stage with respect to the data platform. In the case of the file stage being an internal stage, that internal stage could be server-side-encrypted but not client-side-encrypted.

At operation 604, the database manager 102 receives a file-catalog-table-creation instruction from the client 116. The file-catalog-table-creation instruction requests creation by the data platform of a file-catalog table for the file stage. In some cases, the stage-creation instruction includes the file-catalog-table-creation instruction—for example, a flag such as 'store_file_catalog' could be set to true as part of a "create stage" command, as described above; in such cases, the file-catalog table could be a built-in file-catalog table that is managed by the data platform 100.

In other cases, the file-catalog-table-creation instruction could be received after the receiving of the stage-creation instruction and the corresponding creation of the stage. For example, a user could employ a "create table" command to create a file-catalog table in connection with a stage. In some such embodiments, the data platform 100 may receive a call to a table function such as list_files( ), and may responsively execute the associated table function to populate the file-catalog table, with, e.g., one or more outward-facing properties of the files in that file stage. In this type of embodiment, the file-catalog table may be a user-designed file-catalog table. In other cases, the file-catalog table could be a built-in file-catalog table in embodiments in which the data platform 100 permits, e.g., the enabling of a flag such as 'store-file-catalog' subsequent to creation of the associated stage.

At operation 606, the database manager 102, in response to receiving the file-catalog-table-creation instruction at operation 604, creates the requested file-catalog table for the file stage, where the file-catalog table contains one or more metadata items corresponding to one or more files in the file stage that was requested to be created at operation 602. The database manager 102 may create the file-catalog table in a database in the user account on the data platform 100. Both the file-catalog table and the file stage could be objects within a database object that represents the database in the user account. After the file-catalog table has been created, the database manager 102 may receive and execute one or more database-table commands on the file-catalog table. These commands may include selecting from the file-catalog table, creating one of more views over the file-catalog table, applying one or more predicates to the file-catalog table, and/or the like.

In at least one embodiment, the database manager 102 may receive an external-function call with respect to the file stage, and may responsively execute an associated external function to retrieve metadata and/or content with respect to one or more of the files in the file stage. The retrieved metadata and/or content may include one or more outward-facing properties and/or one or more content-dependent properties of one or more of the files in the file stage.

The database manager 102 may execute a refresh command one or more times with respect to the file-catalog table. For example, the database manager 102 may execute the refresh command periodically with respect to the file-catalog table.

Moreover, the database manager 102 may receive and execute commands to create and share a view (e.g., a secure view) over the file-catalog table. The view may include presigned URLs for providing access to files referenced in the view, and the files referenced in the view may be less than all of the files in the file stage.

The database manager 102 may implement a stream on the file stage, and may update the file-catalog table based on the stream on the file stage, in some cases using a task with respect to the stream for updating the file-catalog table. The database manager 102 may implement a stream on the file-catalog table, and may update a second (e.g., derivative) table based on the stream on the file-catalog table. In some embodiments, the database manager 102 utilizes a notification service (via, e.g., a notification integration) to receive notifications with respect to changes to the file stage, and updates the file-catalog table based on notifications received from the notification service.

In at least one embodiment, the file-catalog-table-creation instruction (that is received at operation 604) requests creation by the data platform 100 of a (unified) file-catalog table for multiple file stages (including the example file stage that is discussed above in connection with the method 600). In such embodiments, the file-catalog table may contain one or more metadata items corresponding to one or more files across multiple file stages. The multiple file stages may include at least one internal stage with respect to the data platform 100 and at least one external stage with respect to the data platform 100. Instead or in addition, the multiple file stages may span multiple cloud-storage platforms (e.g., one or more of the cloud-storage platforms 118 and in some cases a cloud-storage platform utilized by the data platform 100 for implementing its storage platform 110).

As described above, in one or more embodiments of the method 600, the file stage could be internal or external. The requested file-catalog table could be user-defined or could be a built-in file-catalog table. The file-catalog-table-creation instruction that is received at operation 604 could be part of the stage-creation instruction that is received at operation 602; that is, the file stage could be requested as part of the instruction to create the stage. In other embodiments, the file-catalog-table-creation instruction that is received at operation 604 is received after stage creation, e.g., using a "create table" syntax and then populating the created table using a function such as list_files( ). One or more streams could be created on one or more tables, and one or more tasks could be created with respect to one or more streams. External functions could be employed via API integrations. Furthermore, any one or more of the numerous options described herein could be present in one or more embodiments of the method 600. Moreover, numerous other methods could be defined as well.

Figure 7:
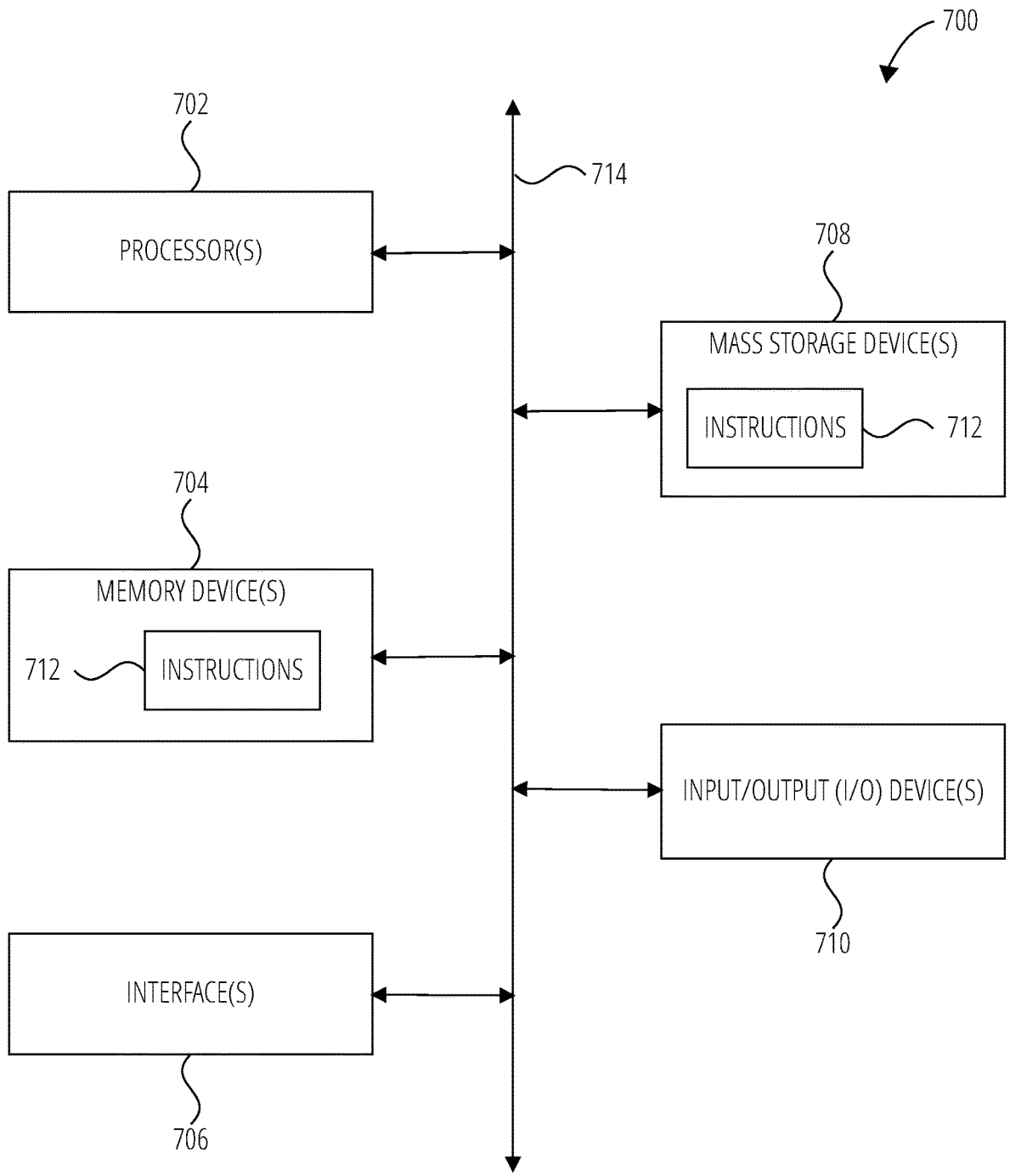
FIG. 7 illustrates an example computing device, in accordance with at least one embodiment.

FIG. 7 illustrates an example computing device 700, in accordance with at least one embodiment. In some embodiments, the computing device 700 is used to implement one or more of the systems and components discussed herein. Further, the computing device 700 may interact with any of the systems and components described herein. Accordingly, the computing device 700 may be used to perform various procedures and tasks, such as those discussed herein. The computing device 700 can function as a server, a client, or any other computing entity. The computing device 700 can be any of a wide variety of computing devices, such as a desktop computer, a notebook computer, a server computer, a handheld computer, a mobile device, a tablet, and/or the like.

In the depicted embodiment, the computing device 700 includes one or more processor(s) 702, one or more memory device(s) 704, one or more interface(s) 706, one or more mass storage device(s) 708, and one or more input/output device(s) 710, all of which are coupled to a bus 714. The processor(s) 702 includes one or more processors or controllers that execute instructions stored in the memory device(s) 704 and/or the mass storage device(s) 708.

The memory device(s) 704 can include various computer-storage media, such as volatile memory (e.g., random access memory (RAM)) and/or nonvolatile memory (e.g., read-only memory (ROM)). The memory device(s) 704 may also include rewritable ROM, such as Flash memory. The processor(s) 702 may also include various types of computer-storage media, such as cache memory.

The interface(s) 706 may include various interfaces that allow the computing device 700 to interact with other systems, devices, computing environments, and/or the like. Example interface(s) 706 include any number of different network interfaces, such as interfaces to local area networks (LANs), wide area networks (WANs), wireless networks, the Internet, and/or the like.

The mass storage device(s) 708 may include various computer-storage media, such as magnetic tapes, magnetic disks, optical disks, solid-state memory (e.g., Flash memory), and so forth. Various drives may also be included in the mass storage device(s) 708 to enable reading from and/or writing to the various computer-storage media. The mass storage device(s) 708 may include removable media and/or non-removable media.

The input/output device(s) 710 may include various devices that allow data and/or other information to be input to and/or retrieved from the computing device 700. Example input/output device(s) 710 include cursor-control devices, keyboards, keypads, microphones, monitors or other display devices, speakers, printers, network interface cards, modems, lenses, CCDs or other image-capture devices, and the like.

The bus 714 allows the processor(s) 702, the memory device(s) 704, the interface(s) 706, the mass storage device(s) 708, and the input/output device(s) 710 to communicate with one another, as well as with other devices or components that may be coupled to the bus 714. The bus 714 represents one or more of several types of bus structures, such as a system bus, a PCI bus, an IEEE 1394 bus, a USB bus, and/or the like. In some examples, the bus 714 includes one or more network connections.

For purposes of illustration, programs and other executable program components are shown herein as discrete blocks, although it is understood that such programs and components may reside at various times in different storage components of the computing device 700 and are executed by the processor(s) 702. Alternatively, the systems and procedures described herein can be implemented in hardware, or using a combination of hardware and software and/or firmware. For example, one or more application specific integrated circuits (ASICs) can be programmed to carry out one or more of the systems and procedures described herein.

Executable Instructions and Computer-Storage Medium/Media

The various memories may store one or more sets of instructions 712 and data structures (e.g., software) embodying or utilized by any one or more of the methodologies or functions described herein. These instructions 712, when executed by the processor(s) 702, cause various operations to implement the disclosed embodiments.

As used herein, the terms "computer-storage medium (and media)," "machine-storage medium (and media)," and "device-storage medium (and media)" mean the same thing and may be used interchangeably in this disclosure. The terms refer to a single storage device or multiple storage devices and/or media (e.g., a centralized or distributed database, and/or associated caches and servers) that store executable instructions and/or data. The terms shall accordingly be taken to include, but not be limited to, solid-state memories as well as optical and magnetic media, including memory internal or external to processors. Specific examples of computer-storage media, machine-storage media, and/or device-storage media include non-volatile memory, include by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "computer-storage medium (and media)," "machine-storage medium (and media)," and "device-storage medium (and media)" specifically exclude carrier waves, modulated data signals, and other such media, at least some of which are covered under the term "transmission medium (and media)" discussed below.

Transmission Medium/Media

In various example embodiments, any network or portion of a network described herein may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi network, another type of network, or a combination of two or more such networks. For example, any network or portion of a network described herein may include a wireless or cellular network, and one or more utilized couplings may be Code Division Multiple Access (CDMA) connections, Global System for Mobile communications (GSM) connections, or another type of cellular or wireless coupling. In this example, a coupling may implement any of a variety of types of data-transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, and/or other data-transfer technology.

The instructions 712 may be transmitted or received over a network using a transmission medium via a network interface device (e.g., a network interface component) and utilizing any one of a number of well-known transfer protocols (e.g., hypertext transfer protocol (HTTP)). Similarly, the instructions 712 may be transmitted or received using a transmission medium via a coupling (e.g., a peer-to-peer coupling) to one or more devices. The terms "transmission medium (and media)" and "signal medium (and media)" mean the same thing and may be used interchangeably in this disclosure. The terms "transmission medium (and media)" and "signal medium (and media)" shall be taken to include any intangible medium that is capable of storing, encoding, or carrying the instructions 712 for execution by the computing device 700, and include digital or analog communications signals or other intangible media to facilitate communication of such software. Hence, the terms "transmission medium (and media)" and "signal medium (and media)" shall be taken to include any form of modulated data signal, carrier wave, and so forth. The term "modulated data signal" means a signal that has one or more of its characteristics set or changed in such a manner as to encode information in the signal.

Computer-Readable Medium/Media

The terms "computer-readable medium (and media)," "machine-readable medium (and media)," and "device-readable medium (and media)" mean the same thing and may be used interchangeably in this disclosure. The terms are defined to include both computer-storage media and transmission media. Thus, the terms include both storage devices and storage media as well as carrier waves and modulated data signals.

Examples of Embodiments

Following is a list of some examples of embodiments.

Example 1 is a method that includes receiving, at a data platform that includes at least one hardware processor, a stage-creation instruction from a client, the stage-creation instruction requesting creation by the data platform of creation of a file stage for a user account on the data platform, the user account being associated with the client; receiving, at the data platform, a file-catalog-table-creation instruction from the client, the file-catalog-table-creation instruction requesting creation by the data platform of a file-catalog table for the file stage; and creating, by the data platform in response to receiving the file-catalog-tablecreation instruction, the file-catalog table for the file stage, the file-catalog table containing one or more metadata items corresponding to one or more files in the file stage.

Example 2 is the method of Example 1, where the file stage includes an internal stage with respect to the data platform.

Example 3 is the method of Example 1, where the file stage includes an external stage with respect to the data platform.

Example 4 is the method of any of the Examples 1-3, where the stage-creation instruction includes the file-catalog-table-creation instruction; and the creating of the file-catalog table for the file stage includes creating a built-in file-catalog table for the file stage in response to receiving the stage-creation instruction, the built-in file-catalog table being managed by the data platform.

Example 5 is the method of any of the Examples 1-3, where the receiving of the file-catalog-table-creation instruction occurs subsequent to the receiving of the stage-creation instruction.

Example 6 is the method of Example 5, further including receiving a list-files-table-function call from the client with respect to the file stage: and executing, in response to receiving the list-files-function call, a list-files table function to populate the file-catalog table.

Example 7 is the method of any of the Examples 1-6, further including receiving and executing commands to create and share a view over the file-catalog table, the view including presigned URLs for providing access to files referenced in the view, the files referenced in the view being less than all of the files in the file stage.

Example 8 is the method of any of the Examples 1-7, further including implementing a stream on the file stage; and updating the file-catalog table based on the stream on the file stage.

Example 9 is the method of any of the Examples 1-8, further including implementing a stream on the file-catalog table; and updating a second table based on the stream on the file-catalog table.

Example 10 is the method of any of the Examples 1-9, where the file-catalog-table-creation instruction requests creation by the data platform of a file-catalog table for a plurality of file stages, the plurality of file stages including the file stage; and the file-catalog table contains one or more metadata items corresponding to one or more files across the plurality of file stages.

Example 11 is a data platform that includes at least one hardware processor; and one or more computer-storage media containing instructions executable by the at least one hardware processor for causing the at least one hardware processor to perform operations including receiving a stage-creation instruction from a client, the stage-creation instruction requesting creation by the data platform of creation of a file stage for a user account on the data platform, the user account being associated with the client; receiving a file-catalog-table-creation instruction from the client, the file-catalog-table-creation instruction requesting creation by the data platform of a file-catalog table for the file stage; and creating, in response to receiving the file-catalog-table-creation instruction, the file-catalog table for the file stage, the file-catalog table containing one or more metadata items corresponding to one or more files in the file stage.

Example 12 is the data platform of Example 11, where the file stage includes an internal stage with respect to the data platform.

Example 13 is the data platform of Example 11, where the file stage includes an external stage with respect to the data platform.

Example 14 is the data platform of any of the Examples 11-13, where the stage-creation instruction includes the file-catalog-table-creation instruction; and the creating of the file-catalog table for the file stage includes creating a built-in file-catalog table for the file stage in response to receiving the stage-creation instruction, the built-in file-catalog table being managed by the data platform.

Example 15 is the data platform of any of the Examples 11-13, where the receiving of the file-catalog-table-creation instruction occurs subsequent to the receiving of the stage-creation instruction.

Example 16 is the data platform of Example 15, the operations further including receiving a list-files-table-function call from the client with respect to the file stage: and executing, in response to receiving the list-files-function call, a list-files table function to populate the file-catalog table.

Example 17 is the data platform of any of the Examples 11-16, the operations further including receiving and executing commands to create and share a view over the file-catalog table, the view including presigned URLs for providing access to files referenced in the view, the files referenced in the view being less than all of the files in the file stage.

Example 18 is the data platform of any of the Examples 11-17, the operations further including implementing a stream on the file stage; and updating the file-catalog table based on the stream on the file stage.

Example 19 is the data platform of any of the Examples 11-18, the operations further including implementing a stream on the file-catalog table; and updating a second table based on the stream on the file-catalog table.

Example 20 is the data platform of any of the Examples 11-19, where the file-catalog-table-creation instruction requests creation by the data platform of a file-catalog table for a plurality of file stages, the plurality of file stages including the file stage; and the file-catalog table contains one or more metadata items corresponding to one or more files across the plurality of file stages.

Example 21 is one or more computer-storage media containing instructions executable by at least one hardware processor of a data platform for causing the at least one hardware processor to perform operations including receiving a stage-creation instruction from a client, the stage-creation instruction requesting creation by the data platform of creation of a file stage for a user account on the data platform, the user account being associated with the client; receiving a file-catalog-table-creation instruction from the client, the file-catalog-table-creation instruction requesting creation by the data platform of a file-catalog table for the file stage; and creating, in response to receiving the file-catalog-table-creation instruction, the file-catalog table for the file stage, the file-catalog table containing one or more metadata items corresponding to one or more files in the file stage.

Example 22 is the one or more computer-storage media of Example 21, where the file stage includes an internal stage with respect to the data platform.

Example 23 is the one or more computer-storage media of Example 21, where the file stage includes an external stage with respect to the data platform.

Example 24 is the one or more computer-storage media of any of the Examples 21-23, where the stage-creation instruction includes the file-catalog-table-creation instruction; and the creating of the file-catalog table for the file stage includes creating a built-in file-catalog table for the file stage in response to receiving the stage-creation instruction, the built-in file-catalog table being managed by the data platform.

Example 25 is the one or more computer-storage media of any of the Examples 21-23, where the receiving of the file-catalog-table-creation instruction occurs subsequent to the receiving of the stage-creation instruction.

Example 26 is the one or more computer-storage media of Example 25, the operations further including receiving a list-files-table-function call from the client with respect to the file stage: and executing, in response to receiving the list-files-function call, a list-files table function to populate the file-catalog table.

Example 27 is the one or more computer-storage media of any of the Examples 21-26, the operations further including receiving and executing commands to create and share a view over the file-catalog table, the view including presigned URLs for providing access to files referenced in the view, the files referenced in the view being less than all of the files in the file stage.

Example 28 is the one or more computer-storage media of any of the Examples 21-27, the operations further including implementing a stream on the file stage; and updating the file-catalog table based on the stream on the file stage.

Example 29 is the one or more computer-storage media of any of the Examples 21-28, the operations further including implementing a stream on the file-catalog table; and updating a second table based on the stream on the file-catalog table.

Example 30 is the one or more computer-storage media of any of the Examples 21-29, where the file-catalog-table-creation instruction requests creation by the data platform of a file-catalog table for a plurality of file stages, the plurality of file stages including the file stage; and the file-catalog table contains one or more metadata items corresponding to one or more files across the plurality of file stages.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the respective terms and phrases.

It is further noted that, as used in this specification and in the appended claims, the singular forms "a," "an," and "the" include plural referents unless the context clearly dictates otherwise.

As used herein, the terms "comprising," "including," "containing," "characterized by," and grammatical equivalents thereof are inclusive, open-ended terms that do not exclude additional, unrecited elements, method steps, or the like.

Many of the functional units described in this specification may be implemented as one or more components, which is a term used to more particularly emphasize their implementation independence. For example, a component may be implemented as a hardware circuit including custom very large-scale integration (VLSI) circuits or gate arrays, off-the-shelf semiconductors such as logic chips, transistors, and/or other discrete components. A component may also be implemented in programmable hardware devices such as field programmable gate arrays (FPGAs), programmable array logic, programmable logic devices, and/or the like.

Components may also be implemented in software for execution on various types of hardware (e.g., by various types of processors). An identified component of executable code may, for instance, include one or more physical or logical blocks of computer instructions, which may, for instance, be organized as an object, a procedure, or a function. Nevertheless, the executable instructions of an identified component need not be physically located together but may include disparate instructions stored in different locations that, when joined logically together, make up the component and achieve the stated purpose for the component.

Indeed, a component of executable code may be a single instruction, or many instructions, and may be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the claims.

What is claimed is:

1. A method performed by a data platform executing instructions on at least one hardware processor, the method comprising:
   receiving, from a client associated with a user account, a request to populate a file-catalog table of the user account based on a plurality of files stored in a file stage for the user account, the user account being associated with one or more databases that collectively include one or more tables, the file stage being represented in the user account by file-stage object that includes an indication of a particular storage location of the file stage;
   executing, in response to receiving the request to populate the file-catalog table, a list-files table function with respect to the file stage, the list-files table function being configured to generate a database-table object having a row for each file stored in the file stage; and
   populating the file-catalog table of the user account based on the database-table object generated by the list-files table function, the file-catalog table being an addition to the one or more tables in the one or more databases with which the user account is associated.

2. The method of claim 1, wherein the database-table object further comprises a column for each of at least two different metadata properties of the plurality of files in the file stage.

3. The method of claim 1, further comprising:
   receiving, from the client, a stage-creation instruction requesting creation of the file stage for the user account, the stage-creation instruction comprising a file-catalog-table-creation instruction requesting creation of the file-catalog table for the file stage; and
   creating, in response to receiving the stage-creation instruction, the file stage and the file-catalog table for the file stage.

4. The method of claim 3, wherein the file-catalog table comprises a built-in file-catalog table that is managed by the data platform.

5. The method of claim 3, wherein:
   the creating of the file stage comprises creating a file-stage object representing the file stage in the user account;
   the file stage comprises data storage having a particular storage location; and
   the file-stage object comprises an indication of the particular storage location.

6. The method of claim 1, further comprising:
   receiving, from the client, a file-catalog-table-creation instruction requesting creation of the file-catalog table for the file stage; and
   creating, in response to receiving the file-catalog-table-creation instruction, the file-catalog table for the file stage.

7. The method of claim 1, further comprising receiving a list-files-table-function call from the client with respect to the file stage, the executing of the list-files table function with respect to the file stage being performed responsive to receiving the list-files-table-function call from the client.

8. The method of claim 1, further comprising receiving and executing commands to create and share a view over the file-catalog table, the view comprising presigned Uniform Resource Locators (URLs) for providing access to files referenced in the view, the files referenced in the view being less than all of the files in the file stage.

9. The method of claim 1, wherein the file stage comprises an internal stage with respect to the data platform.

10. The method of claim 1, wherein the file stage comprises an external stage with respect to the data platform.

11. A data platform comprising:
    at least one hardware processor; and
    one or more computer-storage media containing instructions that, when executed by the at least one hardware processor, cause the data platform to perform operations including:
      receiving, from a client associated with a user account, a request to populate a file-catalog table of the user account based on a plurality of files stored in a file stage for the user account, the user account being associated with one or more databases that collectively include one or more tables, the file stage being represented in the user account by a file-stage object that includes an indication of a particular storage location of the file stage;
      executing, in response to receiving the request to populate the file-catalog table, a list-files table function with respect to the file stage, the list-files table function being configured to generate a database-table object having a row for each file stored in the file stage; and
      populating the file-catalog table of the user account based on the database-table object generated by the list-files table function, the file-catalog table being an addition to the one or more tables in the one or more databases with which the user account is associated.

12. The data platform of claim 11, wherein the database-table object further comprises a column for each of at least two different metadata properties of the plurality of files in the file stage.

13. The data platform of claim 11, the operations further comprising:
    receiving, from the client, a stage-creation instruction requesting creation of the file stage for the user account, the stage-creation instruction comprising a file-catalog-table-creation instruction requesting creation of the file-catalog table for the file stage; and creating, in response to receiving the stage-creation instruction, the file stage and the file-catalog table for the file stage.

14. The data platform of claim 13, wherein the file-catalog table comprises a built-in file-catalog table that is managed by the data platform.

15. The data platform of claim 13, wherein:
the creating of the file stage comprises creating a file-stage object representing the file stage in the user account;
the file stage comprises data storage having a particular storage location; and
the file-stage object comprises an indication of the particular storage location.

16. The data platform of claim 11, the operations further comprising:
receiving, from the client, a file-catalog-table-creation instruction requesting creation of the file-catalog table for the file stage; and
creating, in response to receiving the file-catalog-table-creation instruction, the file-catalog table for the file stage.

17. The data platform of claim 11, the operations further comprising receiving a list-files-table-function call from the client with respect to the file stage, the executing of the list-files table function with respect to the file stage being performed responsive to receiving the list-files-table-function call from the client.

18. The data platform of claim 11, the operations further comprising receiving and executing commands to create and share a view over the file-catalog table, the view comprising presigned Uniform Resource Locators (URLs) for providing access to files referenced in the view, the files referenced in the view being less than all of the files in the file stage.

19. The data platform of claim 11, wherein the file stage comprises an internal stage with respect to the data platform.

20. The data platform of claim 11, wherein the file stage comprises an external stage with respect to the data platform.

21. One or more computer-storage media containing instructions that, when executed by at least one hardware processor of a data platform, cause the at least one hardware processor to perform operations including:
receiving, from a client associated with a user account, a request to populate a file-catalog table of the user account based on a plurality of files stored in a file stage for the user account, the user account being associated with one or more databases that collectively include one or more tables, the file stage being represented in the user account by a file-stage object that includes an indication of a particular storage location of the file stage;
executing, in response to receiving the request to populate the file-catalog table, a list-files table function with respect to the file stage, the list-files table function being configured to generate a database-table object having a row for each file stored in the file stage; and
populating the file-catalog table of the user account based on the database-table object generated by the list-files table function, the table being an addition to the one or more tables in the one or more databases with which the user account is associated.

22. The one or more computer-storage media of claim 21, the operations further comprising:
receiving, from the client, a stage-creation instruction requesting creation of the file stage for the user account, the stage-creation instruction comprising a file-catalog-table-creation instruction requesting creation of the file-catalog table for the file stage; and
creating, in response to receiving the stage-creation instruction, the file stage and the file-catalog table for the file stage.

23. The one or more computer-storage media of claim 22, wherein the file-catalog table comprises a built-in file-catalog table that is managed by the data platform.

24. The one or more computer-storage media of claim 22, wherein:
the creating of the file stage comprises creating a file-stage object representing the file stage in the user account;
the file stage comprises data storage having a particular storage location; and
the file-stage object comprises an indication of the particular storage location.

25. The one or more computer-storage media of claim 21, the operations further comprising receiving a list-files-table-function call from the client with respect to the file stage, the executing of the list-files table function with respect to the file stage being performed responsive to receiving the list-files-table-function call from the client.

* * * * *

UNITED STATES PATENT AND TRADEMARK OFFICE
CERTIFICATE OF CORRECTION

| | | |
|---|---|---|
| PATENT NO. | : 11,494,438 B2 | Page 1 of 1 |
| APPLICATION NO. | : 17/645415 | |
| DATED | : November 8, 2022 | |
| INVENTOR(S) | : Paulus et al. | |

It is certified that error appears in the above-identified patent and that said Letters Patent is hereby corrected as shown below:

On the Title Page

On page 2, in Column 2, under "U.S. Patent Documents", Line 11, delete "2019/0008981" and insert --2019/0089810-- therefor On page 2, in Column 2, under "U.S. Patent Documents", Line 12, delete "2019/0020541" and insert --2019/0205410-- therefor In the Claims In Column 41, Line 39, In Claim 1, after "by", insert --a--

In Column 44, Line 14, In Claim 21, before "table being", insert --file-catalog--

Signed and Sealed this
Twenty-ninth Day of August, 2023

Katherine Kelly Vidal
*Director of the United States Patent and Trademark Office*